United States Patent
Kim et al.

(10) Patent No.: US 10,288,479 B2
(45) Date of Patent: May 14, 2019

(54) OPTICAL DEVICE INCLUDING SLOT AND APPARATUS EMPLOYING THE OPTICAL DEVICE

(71) Applicants: SAMSUNG ELECTRONICS CO., LTD., Suwon-si (KR); KOREA UNIVERSITY RESEARCH AND BUSINESS FOUNDATION, Seoul (KR)

(72) Inventors: Jineun Kim, Suwon-si (KR); Younggeun Roh, Seoul (KR); Q Han Park, Seoul (KR); Yeonsang Park, Seoul (KR); Suyeon Lee, Seoul (KR)

(73) Assignees: SAMSUNG ELECTRONICS CO., LTD., Suwon-si (KR); KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 15/487,549

(22) Filed: Apr. 14, 2017

(65) Prior Publication Data

US 2017/0370773 A1    Dec. 28, 2017

(30) Foreign Application Priority Data

Jun. 24, 2016   (KR) .................. 10-2016-0079272

(51) Int. Cl.
*G01J 3/12*    (2006.01)
*G01J 3/28*    (2006.01)
(Continued)

(52) U.S. Cl.
CPC ............... *G01J 3/12* (2013.01); *G01J 3/0205* (2013.01); *G01J 3/0256* (2013.01);
(Continued)

(58) Field of Classification Search
CPC .......... G01J 3/12; G01J 3/0256; G01J 3/2803; G01J 2003/1295; G02B 1/002
See application file for complete search history.

(56) References Cited

U.S. PATENT DOCUMENTS 4,864,321 A * 9/1989 Sureau .................... H01Q 1/42
                                                      343/700 MS
6,169,466 B1 * 1/2001 Goulouev ............... H01P 1/211
                                                      333/210
(Continued)

FOREIGN PATENT DOCUMENTS

KR   10-2013-0030100 A    3/2013
KR   10-2015-0086098 A    7/2015
KR   10-2015-0128512 A   11/2015

OTHER PUBLICATIONS

Dong Han Ha, et al., "Detection of Molecules using the Nanoparticle Arrays", DBpia, the Korean Society of Mechanical Engineers, http://www.dbpia.co.kr/Article/NODE01112871, Nov. 2008, total 7 pages.

(Continued)

*Primary Examiner* — Marcus H Taningco
(74) *Attorney, Agent, or Firm* — Sughrue Mion, PLLC

(57) ABSTRACT

An optical device including slots and an apparatus employing the optical device are provided. An optical unit device for selectively transmitting electromagnetic waves of a wavelength range, includes a material layer including slots. A gap between the slots has a distance such that the optical unit device has a Q-factor of about 5 or more.

33 Claims, 35 Drawing Sheets

(51) Int. Cl.
  *G02B 1/00*  (2006.01)
  *G01J 3/02*  (2006.01)
  *G01J 3/36*  (2006.01)

(52) U.S. Cl.
  CPC ............... *G01J 3/2803* (2013.01); *G01J 3/36* (2013.01); *G02B 1/002* (2013.01); *G01J 2003/1213* (2013.01)

(56) References Cited

U.S. PATENT DOCUMENTS

| | | | |
|---|---|---|---|
| 9,360,689 B2* | 6/2016 | Liu | G02F 1/025 |
| 9,442,190 B2* | 9/2016 | Rofougaran | H01Q 1/2283 |
| 9,499,400 B2 | 11/2016 | Kim et al. | |
| 2007/0035800 A1* | 2/2007 | Hochberg | G02F 1/3517 |
| | | | 359/237 |
| 2007/0075263 A1 | 4/2007 | Gorrell et al. | |
| 2008/0070010 A1* | 3/2008 | Dravid | G03F 7/405 |
| | | | 428/195.1 |
| 2009/0188544 A1* | 7/2009 | Kobayashi | B82Y 20/00 |
| | | | 136/244 |
| 2009/0250102 A1* | 10/2009 | Kim | H01L 31/035281 |
| | | | 136/255 |
| 2010/0097611 A1* | 4/2010 | Song | G01N 21/553 |
| | | | 356/445 |
| 2013/0070459 A1* | 3/2013 | Kim | B82Y 20/00 |
| | | | 362/259 |
| 2014/0376073 A1* | 12/2014 | Kim | G02B 5/008 |
| | | | 359/241 |
| 2015/0323385 A1 | 11/2015 | Han et al. | |
| 2015/0364898 A1* | 12/2015 | Meng | H01S 5/0425 |
| | | | 372/40 |
| 2016/0341942 A1* | 11/2016 | Cheon | G02B 26/00 |

OTHER PUBLICATIONS

Eric Laux, et al, "Plasmonic photon sorters for spectral and polarimetric imaging", Nature Photonics, Letters, vol. 2, Mar. 2008, pp. 161-164.

J. W. Lee, et al., "Terahertz transparency at Fabry-Perot resonances of periodic slit arrays in a metal plate: experiment and theory", Optics Express, vol. 14, No. 26, Dec. 25, 2006, pp. 12637-12643.

Suyeon Lee, et al, "Dynamic coupling of plasmonic resonators", Scientific Reports, 6:21989, Feb. 25, 2016, pp. 1-8.

Kang, J.H. et al., "Substrate effect on aperture resonances in a thin metal film", Opt. Express, Aug. 31, 2009, pp. 15652-15658 (2009), vol. No. 17, Issue No. 18, OSA Publishing, Seoul, Korea.

* cited by examiner

<COMPARATIVE EXAMPLE >

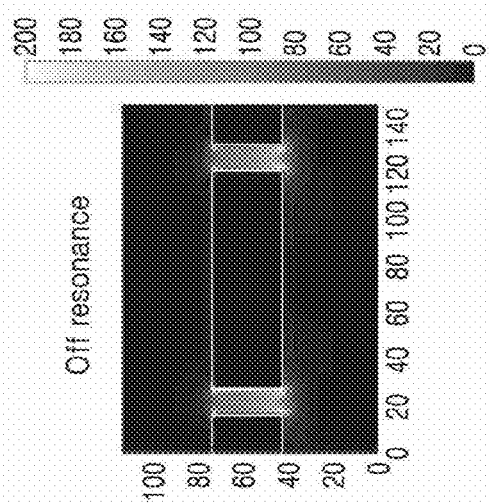
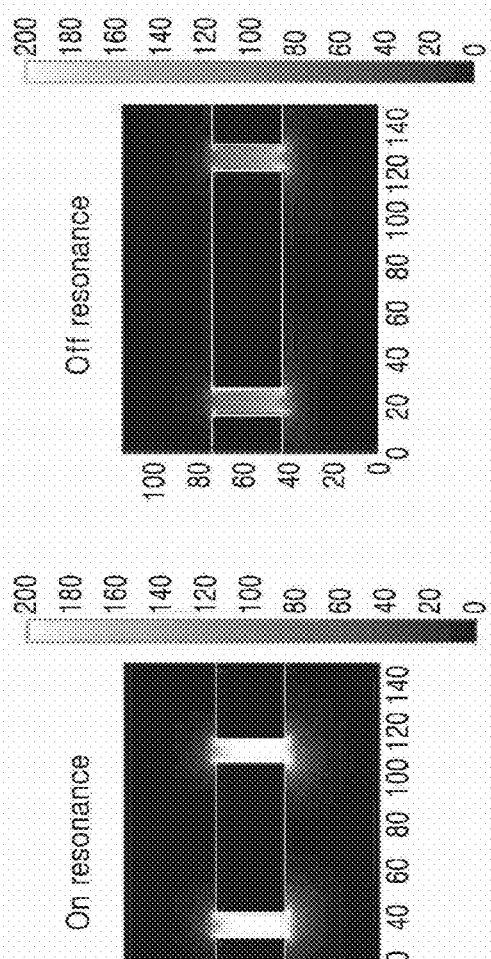
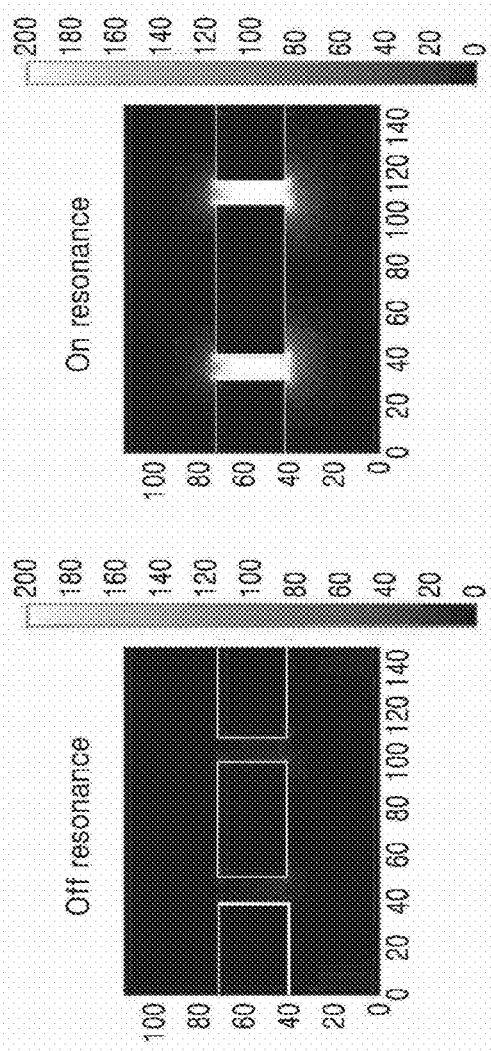
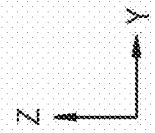

FIG. 19A
FIG. 19B
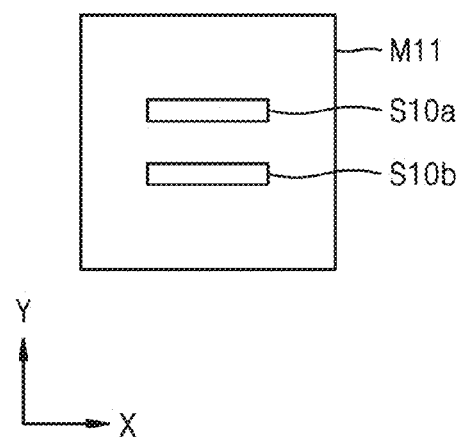
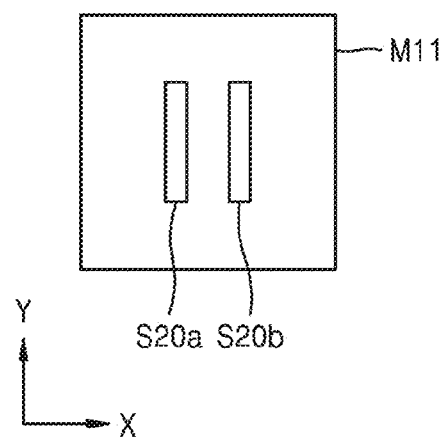

FIG. 33
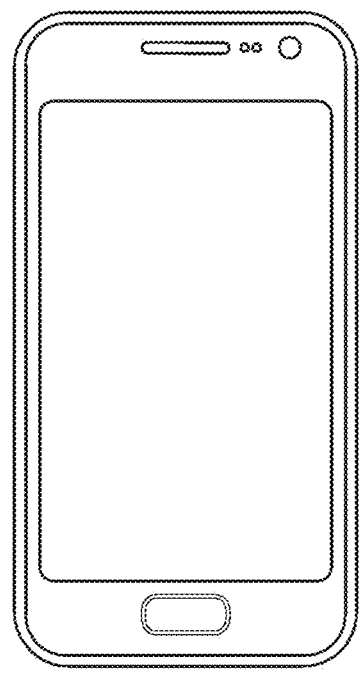
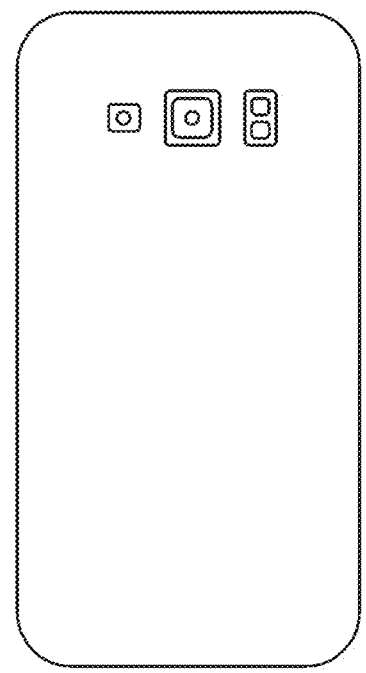
<FRONT SURFACE>
(A)
<REAR SURFACE>
(B)

OPTICAL DEVICE INCLUDING SLOT AND APPARATUS EMPLOYING THE OPTICAL DEVICE

CROSS-REFERENCE TO RELATED APPLICATION

This application claims priority from Korean Patent Application No. 10-2016-0079272, filed on Jun. 24, 2016, in the Korean Intellectual Property Office, the disclosure of which is incorporated herein by reference in its entirety.

BACKGROUND

1. Field

Apparatuses consistent with exemplary embodiments relate to an optical device and an optical apparatus, and more particularly, to an optical device (optical element) including a slot and an optical apparatus employing the optical device.

2. Description of the Related Art

Because a spectrometer according to a related art disperses (splits) light by mainly using a prism or grating structure, a space of about several centimeters to about tens of centimeters is used for dispersing light. As the size of a spectrometer decreases, a spectral resolving power may be lowered.

Technology capable of decreasing the size (miniaturizing) of an optical apparatus such as a spectrometer and improving performance thereof is being developed. A method or technology to improve light efficiency and reduce the size of a unit area (unit device) for light dispersing or imaging is demanded.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide optical devices (optical unit devices) including a plurality of slots and designed to have superior performance.

Exemplary embodiments provide optical devices (optical unit devices) having small sizes and exhibiting superior performance.

Exemplary embodiments provide optical devices (optical unit devices) having relatively simple structures and having high Q-factors and high transmittances.

Exemplary embodiments provide spectral devices (spectro devices) including the optical devices.

Exemplary embodiments provide apparatuses (e.g., spectrometers) including the optical devices.

According to an aspect of an exemplary embodiment, there is provided an optical unit device for selectively transmitting electromagnetic waves of a wavelength range, the optical unit device including a material layer including slots. A gap between the slots has a distance such that the optical unit device has a Q-factor of about 5 or more.

The gap between the slots may have the distance such that the optical unit device has a Q-factor of about 7 or more.

The gap between the slots may have the distance such that the optical unit device has a normalized transmittance of about 3 or more, and the normalized transmittance may be determined by dividing an intensity of electromagnetic waves passing through the material layer including the slots by an intensity of electromagnetic waves passing through a single slot of another optical unit device without the material layer.

A resonance wavelength of the optical unit device may be $\lambda$, a refractive index of a medium contacting an incident surface of the material layer may be n, and the distance of the gap between the slots may be greater than $\lambda/(2.5 \times n)$.

The distance of the gap between the slots may be less than $\lambda/n$.

A resonance wavelength of the optical unit device may be determined based on the gap between the slots.

Each of the slots may have a subwavelength size.

The slots may be parallel to each other.

Each of the slots may have a length in a first direction and a width in a second direction perpendicular to the first direction, and the slots may be spaced apart from each other in the second direction.

The material layer may include two to five slots that are spaced apart from one another by substantially a same gap and are parallel to one another.

The material layer may be a conductive layer.

The slots may be light source-less slots.

The material layer may be sectioned into regions, and each of the regions may include slots parallel to one another.

The material layer may be sectioned into regions, at least one of the regions may include first slots parallel to one another, at least another one of the regions may include second slots parallel to one another, and the second slots may be perpendicular to the first slots.

The optical unit device may be configured to transmit electromagnetic waves of an infrared ray (IR) range.

According to an aspect of an exemplary embodiment, there is provided an optical unit device for selectively transmitting electromagnetic waves of a wavelength range, the optical unit device including a material layer including slots. A gap between the slots may have a distance greater than $\lambda/(2.5 \times n)$ where A refers to a resonance wavelength of the optical unit device and n refers to a refractive index of a medium contacting an incident surface of the material layer.

The distance of the gap between the slots may be less than $\lambda/n$.

The gap between the slots may have the distance such that the optical unit device has a Q-factor of about 5 or more.

The gap between the slots may have the distance such that the optical unit device has a normalized transmittance of about 3 or more, and the normalized transmittance may be determined by dividing an intensity of electromagnetic waves passing through the material layer including slots by an intensity of electromagnetic waves passing through a single slot of another optical unit device without the material layer.

The material layer may include two to five slots that are spaced apart from one another by substantially a same gap and are parallel to one another.

The slots may be light source-less slots.

A spectral device may include a first array device including optical unit devices, each of the optical unit devices including the optical unit device, and at least two of the optical unit devices being configured to transmit electromagnetic waves of different wavelength ranges. The spectral device may further include a second array device including detectors configured to detect electromagnetic waves passing through the first array device.

The first array device may include a first optical unit device and a second optical unit device, the first optical unit device may include a first slot and a second slot, the second optical unit device may include a third slot and a fourth slot, and a gap between the first slot and the second slot may be different from a gap between the third slot and the fourth slot.

Either one or both of the first slot and the second slot may have a dimension different from a dimension of either one or both of the third slot and the fourth slot.

Each of the first slot and the second slot may have a first length, and each of the third slot and the fourth slot may have a second length different from the first length.

The first array device may include a first optical unit device and a second optical unit device, and a number of slots included in the first optical unit device may be different from a number of slots included in the second optical unit device.

The first array device may include a metasurface structure.

A spectrometer may include the spectral device.

An optical measurement apparatus for optically measuring properties of an object, may include a light source configured to irradiate light to the object, an optical sensor including the spectral device, and configured to detect light that is irradiated by the light source and modulated by the object, and a signal processor configured to process a signal that is measured by the optical sensor.

The light source may be configured to irradiate light of an infrared range.

At least a part of the optical measurement apparatus may constitute a wearable device.

At least a part of the optical measurement apparatus may constitute a mobile device.

The spectral device may further include an intermediate layer disposed between the first array device and the second array device, a cover layer disposed on the first array device, and a focusing element array disposed on the cover layer.

According to an aspect of an exemplary embodiment, there is provided an optical unit device for selectively transmitting electromagnetic waves of a wavelength range, the optical unit device including a substrate, and a material layer including slots, and disposed on the substrate. A gap between the slots has a distance corresponding to a Q-factor of the optical unit device, a resonance wavelength of the optical unit device, and a refractive index of the substrate.

The gap between the slots may have the distance such that the Q-factor is about 5 or more, and the distance of the gap between the slots may be greater than $\lambda/(2.5 \times n)$ where $\lambda$ refers to the resonance wavelength of the optical unit device and n refers to the refractive index of the substrate.

BRIEF DESCRIPTION OF THE DRAWINGS

The above and/or other aspects will become apparent and more readily appreciated from the following description of exemplary embodiments, taken in conjunction with the accompanying drawings in which:

FIGS. 16A, 16B, and 16C are images of simulation data for a structure (2-slot structure) having two slots as illustrated in FIG. 3, in which FIG. 16B shows a case in which the gap satisfies a resonance requirement and FIGS. 16A and 16C show cases in which the gap does not satisfy the resonance requirement;

FIGS. 19A and 19B are plan views of two types of optical unit devices according to exemplary embodiments;

FIG. 33 is a diagram of a mobile device, to which an optical measurement apparatus according to an exemplary embodiment is applicable;

DETAILED DESCRIPTION

Figure 1:
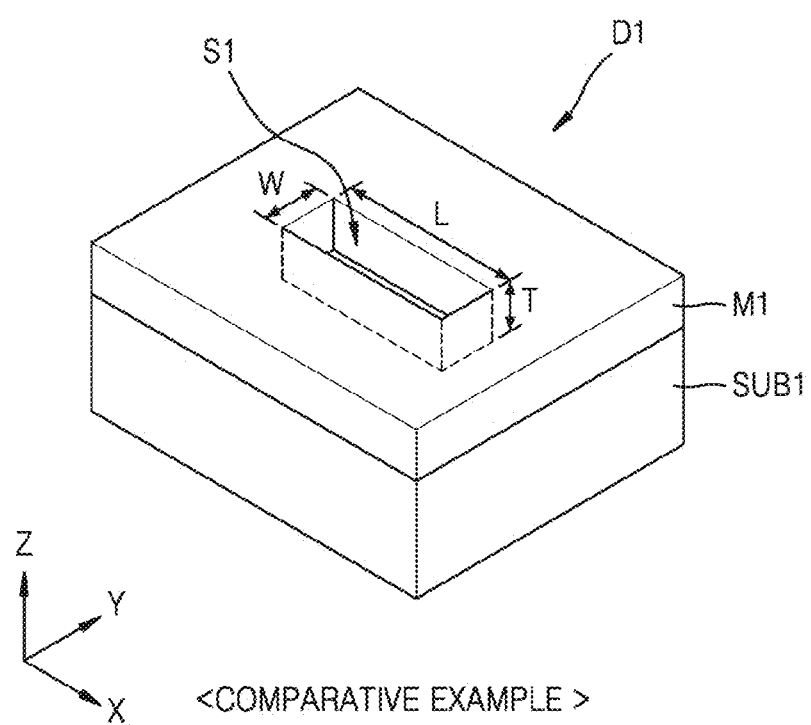
FIG. 1 is a perspective view of an optical unit device according to a comparative example.

Example embodiments will now be described more fully with reference to the accompanying drawings in which the example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of example embodiments. As used herein, the singular forms "a," "an" and "the" are intended to include the plural forms as well, unless the context clearly indicates otherwise. It will be further understood that the terms "may include" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of example embodiments. As such, variations from the shapes of the illustrations as a result, for example, of manufacturing techniques and/or tolerances, are to be expected. Thus, example embodiments are not construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, are interpreted as having a meaning that is consistent with their meaning in the context of the relevant art and will not be interpreted in an idealized or overly formal sense unless expressly so defined herein.

Reference will now be made in detail to an optical device including a slot and an optical apparatus employing the optical device, according to exemplary embodiments, examples of which are illustrated in the accompanying drawings. In the drawings, the width and thicknesses of layers and regions are exaggerated for clarity of the specification and for convenience of explanation. Like reference numerals refer to like elements throughout.

FIG. 1 is a perspective view of an optical unit device D1 according to a comparative example.

Referring to FIG. 1, the optical unit device D1 according to a comparative example may include a conductive material layer M1 where a single slit S1 is formed. The single slot S1 may have a length L, a width W, and a thickness T. The conductive material layer M1 may be arranged on a substrate SUB1. The substrate SUB1 may be, for example, a glass substrate.

Electromagnetic waves of a wavelength range may pass through the single slot S1 formed in the conductive material layer M1. In this state, a resonance frequency may be defined by the single slot S1 in the optical unit device D1 according to a comparative example. In other words, a resonance frequency may be determined by the length L, the width W, and the thickness T of the single slot S1. A resonance wavelength may correspond to the resonance frequency. The resonance wavelength may be greater than the length L of the single slot S1. In a graph showing transmittance of electromagnetic waves passing through the single slot S1, a wavelength corresponding to a peak point may correspond to the resonance wavelength.

Figure 2:
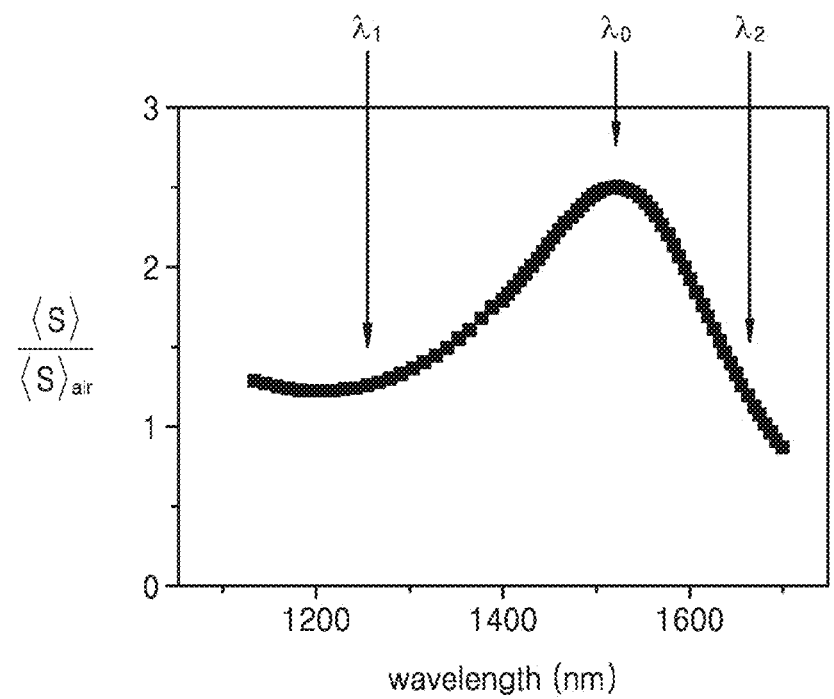
FIG. 2 is a graph of a transmission spectrum of electromagnetic waves passing through a single slot of FIG. 1.

FIG. 2 is a graph of a transmission spectrum of electromagnetic waves passing through the single slot S1 of FIG. 1. In this state, the length L, the width W, and the thickness T of the single slot S1 are 550 nm, 100 nm, and 300 nm, respectively. The conductive material layer M1 is an Ag layer and the substrate SUB1 is a glass substrate. A transmission spectrum is measured by irradiating electromagnetic waves from a side where the substrate SUB1 is formed toward the conductive material layer M1. In FIG. 2, a Y-axis value, that is, $<S>/<S>_{air}$, denotes normalized transmittance. "$<S>$" denotes a pointing vector of the electromagnetic waves passing through the single slot S1 when the conductive material layer M1 exists. "$<S>_{air}$" denotes a pointing vector of the electromagnetic waves passing through a single slot region (i.e., S1 region) when the conductive material layer M1 does not exist. As a value of "$<S>/<S>_{air}$" increases, transmittance increases.

Referring to FIG. 2, a major wavelength of the electromagnetic waves passing through the single slot S1 is about 1522 nm, a peak height (peak value) is about 2.5, and a Q-factor is about 3.4. The Q-factor may be defined by Mathematical Expression 1.

$$Q \equiv \frac{\omega_0}{\Delta\omega} = \frac{1}{\lambda_0}\frac{1}{\frac{1}{\lambda_1}-\frac{1}{\lambda_2}} = \frac{\lambda_1\lambda_2}{\lambda_0(\lambda_2-\lambda_1)}$$ [Mathematical Expression 1]

In Mathematical Expression 1, the Q-factor Q may be defined to be a ratio between the resonance frequency $\omega_0$ (center frequency) and a bandwidth $\Delta\omega$. Also, the Q-factor Q may be defined by a relation between a resonance wavelength $\lambda_0$, and $\lambda_1$ and $\lambda_2$. "$\lambda_1$" and "$\lambda_2$" respectively denote a lower wavelength $\lambda_1$ and an upper wavelength $\lambda_2$ at a point corresponding to 1/2 of the peak value (refer to FIG. 2). The Q-factor Q with respect to the graph of FIG. 2 may be calculated by using Mathematical Expression 1.

Table 1 below is a summary of values obtained from FIG. 2.

TABLE 1

| | Comparative Example (Structure of FIG. 1) | | |
|---|---|---|---|
| Items | Peak Position (nm) | Peak Value | Q-factor |
| Values | 1522 | 2.5 | 3.4 |

Referring to FIG. 2 and the result of Table 1, when the single slot S1 is used as in the comparative example, the Q-factor is as low as about 3.4 and the peak value corresponding to the transmittance (normalized transmittance) is as low as about 2.5. In other words, in the case of using the signal slot S1 as in the comparative example of FIG. 1, although the resonance frequency can be defined by the single slot S1, there is a limit in securing the Q-factor and the transmittance.

Figure 3:
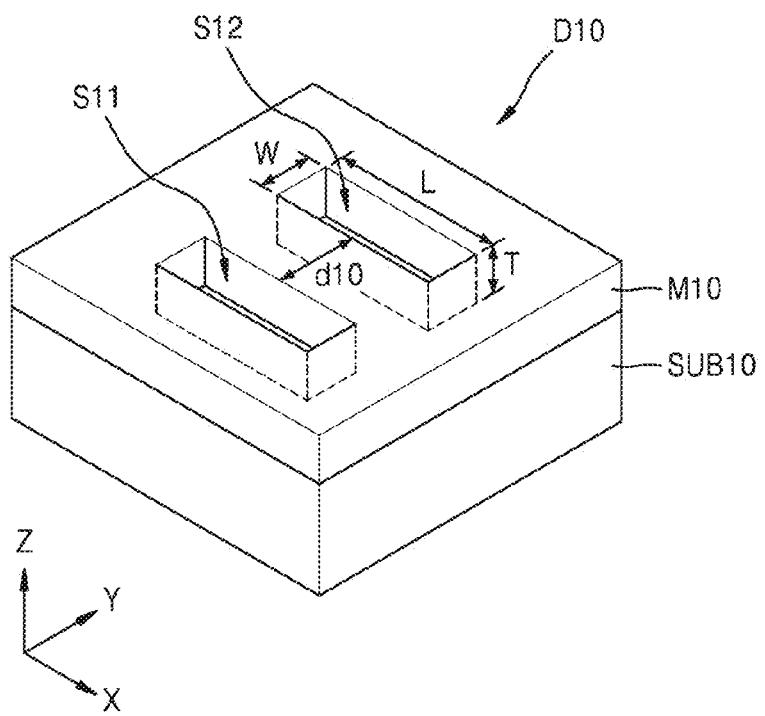
FIG. 3 is a perspective view of an optical unit device according to an exemplary embodiment.

FIG. 3 is a perspective view of an optical unit device D10 according to an exemplary embodiment.

Referring to FIG. 3, the optical unit device D10 according to the exemplary embodiment may include a conductive material layer M10 where a plurality of slots S11 and S12 are formed. A case of using two slots, that is, a first slot S11 and a second slot S12, is illustrated and described. Each of the two slots S11 and S12 may have a length L, a width W, and a thickness T. The slots S11 and S12 may be a "light source-less slot," that is, a slot having no light source. The conductive material layer M10 may be provided on a substrate SUB10. The substrate SUB 10 may include a transparent material with respect to electromagnetic waves of a wavelength range of interest. For example, the substrate SUB 10 may be a glass substrate. However, the material of the substrate SUB 10 is not limited to glass and may be variously changed. For example, the substrate SUB 10 may include a dielectric such as a silicon oxide or, in some cases, semiconductor such as silicon.

In the exemplary embodiment, a gap d10 between the slots S11 and S12 may be controlled to satisfy a requirement (condition) of interaction between electromagnetic waves passing through the first slot S11 and electromagnetic waves passing through the second slot S12. In other words, the gap d10 between the slots S11 and S12 may be controlled to satisfy a requirement of coherence of the electromagnetic waves passing through the first slot S11 and the electromagnetic waves passing through the second slot S12. As a result, the Q-factor of the optical unit device D10 may be much improved and transmittance may also be improved. For example, the Q-factor of the optical unit device D10 may be about 5 or more. The Q-factor of the optical unit device D10 may be about 7 or more or about 8 or more. The normalized transmittance of the optical unit device D10 may be about 3 or more. The normalized transmittance of the optical unit device D10 may be about 5 or more. The normalized transmittance may be defined to be a value, that is, $<S>/<S>_{air}$, obtained by dividing intensity of electromagnetic waves passing through the conductive material layer M10 having the slots S11 and S12 by intensity of electromagnetic waves passing through a single slot area (slot area corresponding to the slot S11) in a state of having no conductive material layer M10.

Figure 4:
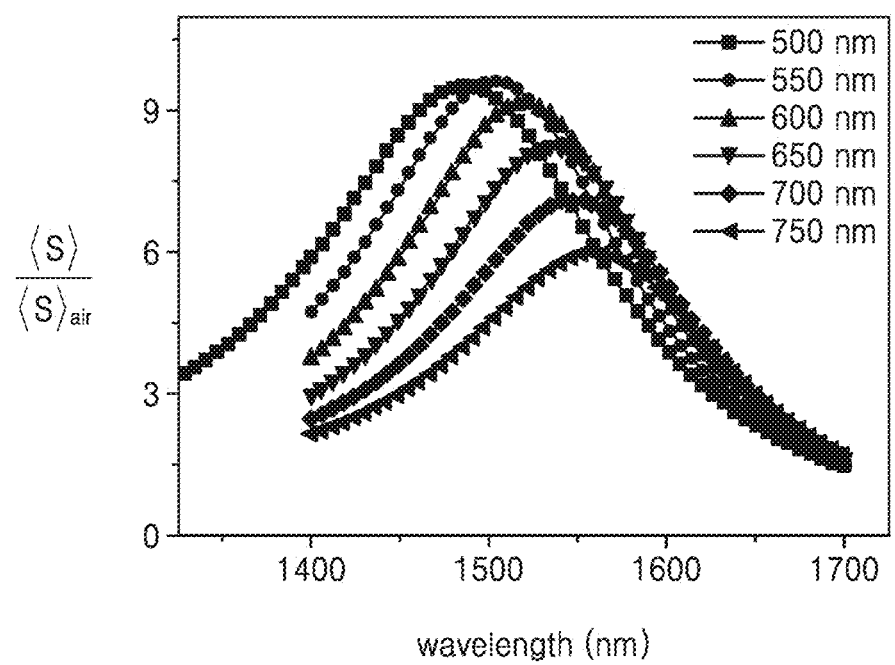
FIG. 4 is a graph of a transmission spectrum of electromagnetic waves passing through the optical unit device having a structure of FIG. 3.

FIG. 4 is a graph of a transmission spectrum of electromagnetic waves passing through the optical unit device D10 having the structure of FIG. 3. In this state, the length L, the width W, and the thickness T of each of the two slots S11 and S12 may be about 550 nm, about 100 nm, and about 300 nm, respectively. The conductive material layer M10 is an Ag layer, and the substrate SUB 10 is a glass substrate. While changing the gap d10 between the two slots S11 and S12 from about 500 nm to about 750 nm by units of about 50 nm, a transmission spectrum is measured. The transmission spectrum is measured by irradiating electromagnetic waves from a side where the substrate SUB 10 is formed toward the conductive material layer M10. In this state, the substrate SUB 10 may be a sort of a "medium" provided on an incident surface of the conductive material layer M10. A refractive index n of the medium (substrate) SUB 10 is about 1.44.

Referring to FIG. 4, when the two slots S11 and S12 are used, the Q-factor and the transmittance may be much increased by about 300%-about 400%, compared to a case of using a single slot as illustrated in FIG. 2. Also, the Q-factor and the resonance wavelength are changed according to the gap d10 between the two slots S11 and S12. Accordingly, the optical unit device D10 may be appropriately designed and used to match the purpose thereof.

Figure 5:
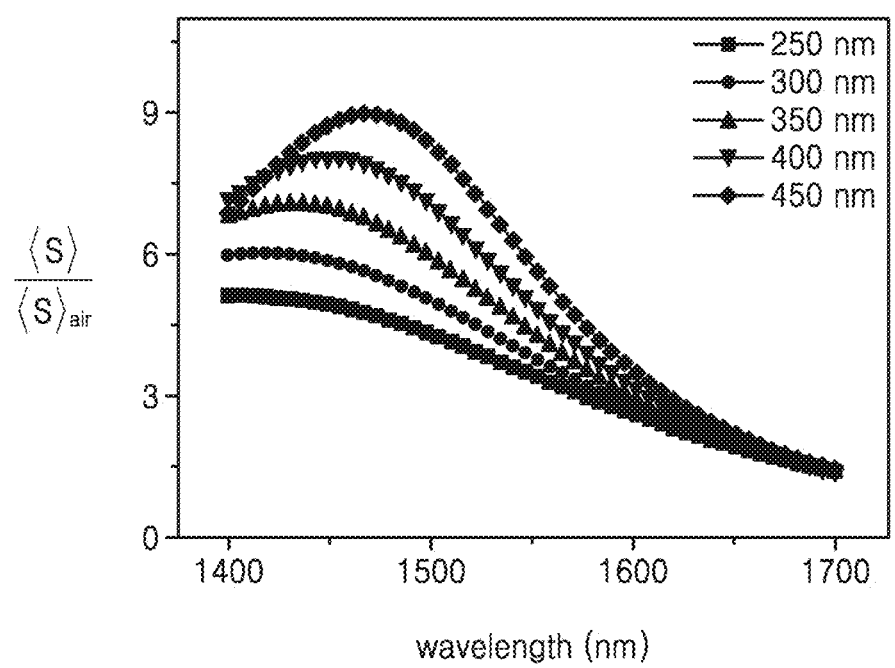
FIG. 5 is a graph of a transmission spectrum of electromagnetic waves passing through the optical unit device having the structure of FIG. 3.

FIG. 5 is a graph of a transmission spectrum of electromagnetic waves passing through the optical unit device D10 having the structure of FIG. 3. While changing the gap d10 between the two slots S11 and S12 from about 250 nm to about 450 nm by units of about 50 nm, a transmission spectrum is measured. The dimensions of the slots S11 and S12 and the constituent materials of the substrate SUB10 and the conductive material layer M10 are the same as those described in FIG. 4.

Referring to FIG. 5, when the gap d10 between the two slots S11 and S12 is about 450 nm, the Q-factor is expected to be about 5.9. When the gap d10 is about 400 nm, the Q-factor is expected to be about 5.2. When the gap d10 is about 350 nm or less, the Q-factor is small or measurement in a wavelength range of interest is impossible. In other words, when the gap d10 is too small, it may be difficult to obtain superior performance of the optical unit device D10.

According to the results of FIGS. 4 and 5, when the gap d10 between the two slots S11 and S12 satisfies requirements (conditions), a high Q-factor and a high transmittance may be obtained. When the gap d10 is too small or too large, it may be difficult to obtain superior performance.

Table 2 below is a summary of values obtained from FIGS. 4 and 5.

TABLE 2

2-Slot Structure (Structure of FIG. 3)

| Gap d10 (nm) | Peak Position (nm) | Peak Value | Q-factor |
| --- | --- | --- | --- |
| 250 | 1406 | 5.1 | |
| 300 | 1418 | 6.0 | |
| 350 | 1431 | 7.0 | |
| 400 | 1449 | 8.1 | 5.2 (expected) |
| 450 | 1467 | 9.0 | 5.9 (expected) |
| 500 | 1486 | 9.5 | 6.9 |
| 550 | 1504 | 9.6 | 7.6 |
| 600 | 1522 | 9.1 | 8.2 |
| 650 | 1535 | 8.2 | 8.3 |
| 700 | 1547 | 7.1 | 8.1 |
| 750 | 1559 | 6.0 | 7.6 |
| 800 | 1571 | 5.0 | 6.9 |
| 850 | 1571 | 4.2 | 5.9 |
| 900 | 1578 | 3.6 | 5.2 |
| 950 | 1571 | 3.1 | 5.0 |

Figure 6:
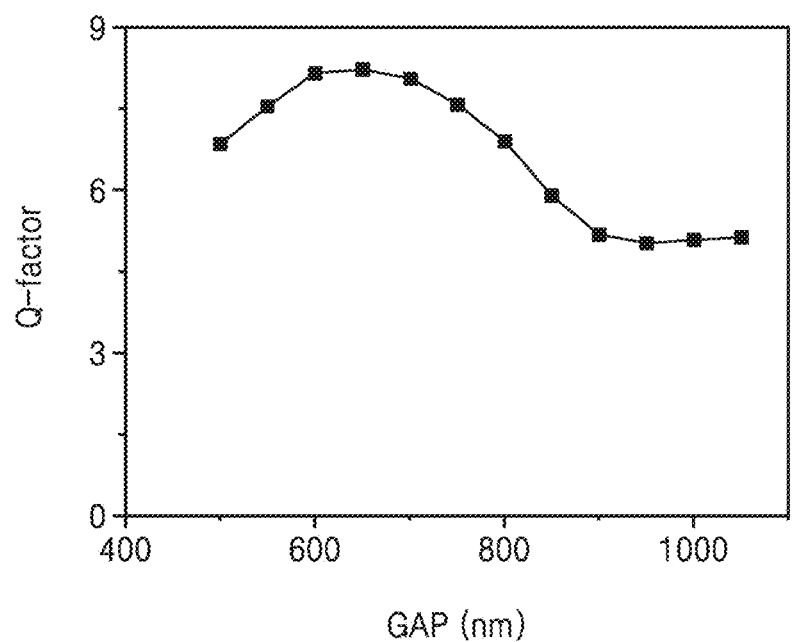
FIG. 6 is a graph showing a change in a Q-factor according to a gap between slots in the optical unit device having the structure of FIG. 3.
Figure 7:
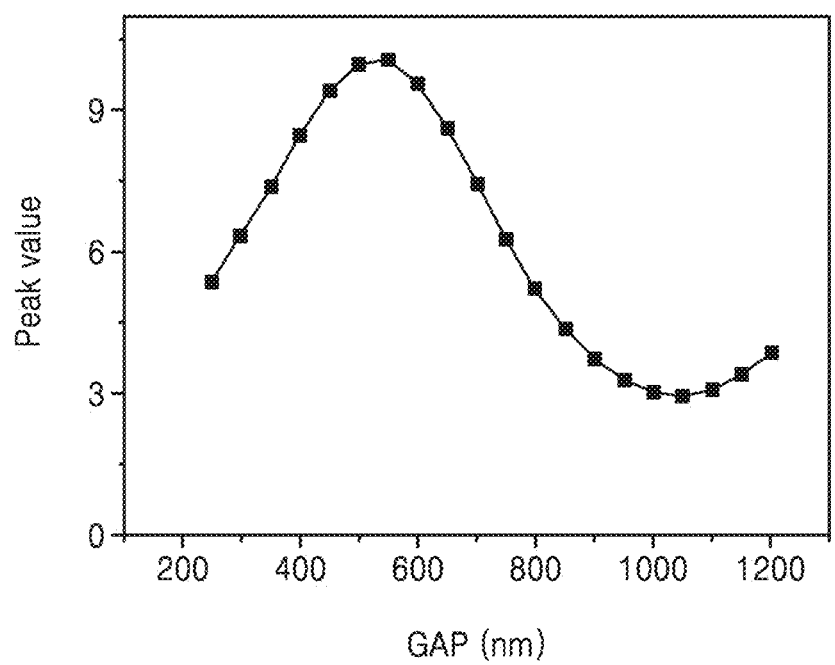
FIG. 7 is a graph showing a change in a peak value according to the gap between the slots in the optical unit device having the structure of FIG. 3.

FIGS. 6 and 7 are graphs showing changes in the Q-factor and a peak value according to a gap between the slots S11 and S12 in the optical unit device D10 having the structure of FIG. 3, obtained from Table 2.

Referring to FIG. 6, a Q-factor of about 5 or more may be obtained in a range of about 500 nm to 950 nm. A high Q-factor of about 7 or more (about 6.9 to about 8.3) may be obtained in a range of about 500 nm to 800 nm.

Referring to FIG. 7, the peak value becomes maximum at about 550 nm and thereabout. A peak value of about 5 or more may be obtained in a range of about 250 nm to about 800 nm. A high peak value may be obtained in a range of about 400 nm to about 750 nm. The peak value may correspond to the above-defined normalized transmittance. Although a peak value is obtained to a degree in a region of about 350 nm or less, it may be difficult to measure and obtain the Q-factor (refer to FIG. 5).

Referring to Table 2 and the results of FIGS. 6 and 7 obtained from Table 2, in the exemplary embodiment, the gap d10 of the two slots S11 and S12 may be determined between about 400 nm and about 950 nm. To secure a Q-factor of about 7 or more (including 6.9) and a normalized transmittance (peak value) of about 5 or more, the gap d10 of the two slots S11 and S12 may be determined between about 500 nm to about 800 nm. However, an appropriate range of the gap d10 may vary according to the dimensions (length/width/thickness) of the slots S11 and S12 and the constituent material of the conductive material layer M10. Also, the appropriate range of the gap d10 may vary according to the constituent material (refractive index) of the substrate SUB 10 and a wavelength range of the electromagnetic waves in use.

According to the exemplary embodiment, assuming that a resonance wavelength of the optical unit device D10 is $\lambda$ and a refractive index of a medium (substrate) contacting the incident surface of the conductive material layer M10 is n, the gap d10 between the slots S11 and S12 may be greater than $\lambda/(2.5\times n)$. The gap d10 in a range of about 400 nm to about 950 nm in Table 2 satisfies the above requirements. In this state, the resonance wavelength $\lambda$ corresponds to a peak position, and the refractive index n of the medium is about 1.44. Also, the gap d10 between the slots S11 and S12 may be less than $\lambda/n$. The gap d10 in a range of about 400 nm to about 950 nm in Table 2 satisfies the above requirements. Accordingly, the gap d10 between the slots S11 and S12 may be greater than $\lambda/(2.5\times n)$ and less than $\lambda/n$.

Figure 8:
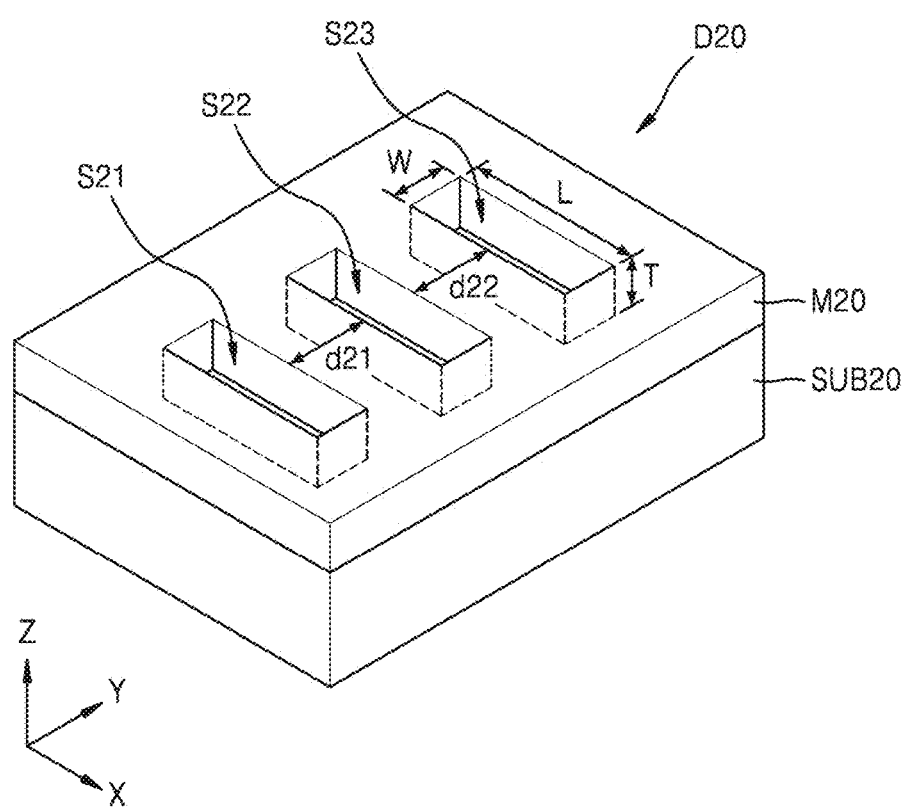
FIG. 8 is a perspective view of an optical unit device according to another exemplary embodiment.

FIG. 8 is a perspective view of an optical unit device D20 according to another exemplary embodiment.

Referring to FIG. 8, the optical unit device D20 according to the exemplary embodiment may include a conductive material layer M20 where a plurality of slots S21, S22, and S23 are formed. A case of using three slots, that is, a first slot S21, a second slot S22, and a third slot S23 is illustrated and described. The slots S21, S22, and S23 may be light sourceless slots. The conductive material layer M20 may be arranged on a substrate SUB 20. The substrate SUB 20 may be the same as the substrate SUB 10 of FIG. 3.

In the exemplary embodiment, a gap d21 between the first slot S21 and the second slot S22 and a gap d22 between the second slot S22 and the third slot S23 may be appropriately selected. In other words, the gaps d21 and d22 may be controlled to satisfy requirements of interaction and/or coherence among electromagnetic waves passing through the slots S21, S22, and S23. As a result, the Q-factor and the transmittance of the optical unit device D20 may be much improved. For example, the Q-factor of the optical unit device D10 may be about 5 or more. The Q-factor of the optical unit device D10 may be about 8 more or about 10 or more. The normalized transmittance of the optical unit device D10 may be about 3 or more. The normalized transmittance of the optical unit device D10 may be about 8 more or about 11 or more. The normalized transmittance may be defined to be a value, that is, $<S>/<S>_{air}$, obtained by dividing intensity of electromagnetic waves passing through the conductive material layer M20 having the slots S21, S22, and S23 by intensity of electromagnetic waves passing through a single slot area (slot corresponding to the slot S22) in a state of having no conductive material layer M20. When three slots, that is, the slots S21, S22, and S23 of FIG. 8, are used, a relatively high Q-factor and a relative high transmittance may be obtained compared to a case of using two slots, that is, the slots S11 and S12, as illustrated in FIG. 3.

Figure 9:
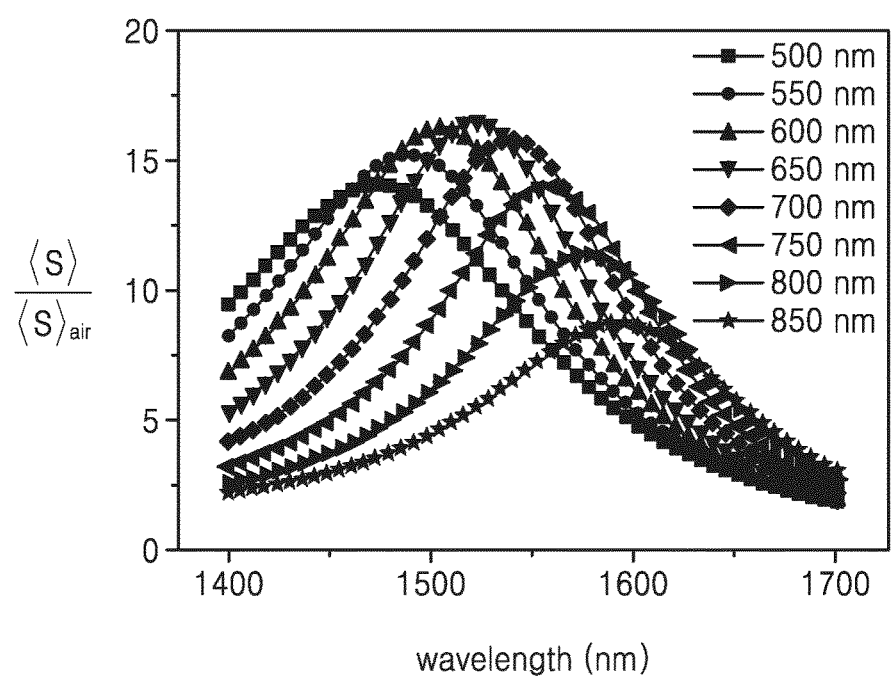
FIG. 9 is a graph of a transmission spectrum of electromagnetic waves passing through an optical unit device having a structure of FIG. 8.

FIG. 9 is a graph of a transmission spectrum of electromagnetic waves passing through the optical unit device D20 having a structure of FIG. 8. In this state, the length L, the width W, and the thickness T of each of the slots S21, S22, and S23 are 550 nm, 100 nm, and 300 nm, respectively. The conductive material layer M20 is an Ag layer, and the substrate SUB 20 is a glass substrate. A transmission spectrum is measured by changing the gas d21 and d22 between the slots S21, S22, and S23 from about 550 nm to about 850 nm by units of 50 nm. In this state, the gaps d21 and d22 are the same. The substrate SUB 20 may be a sort of a "medium" provided on an incident surface of the conductive material layer M20, and the refractive index n of the medium (substrate) SUB20, is about 1.44.

Referring to FIG. 9, when three slots, that is, the slots S21, S22, and S23, are used, the Q-factor is improved by about 300% or more and the transmittance is improved by about 700% or more, compared to the case of using a single slot of FIG. 2. Also, when three slots, that is, the slots S21, S22, and S23, are used, the Q-factor is improved by about 25% and the transmittance is improved by about 60%, compared to the case of using two slots of FIG. 4. Accordingly, as the number of slots increases, the Q-factor and the transmittance are further improved due to the gap control between slots. Also, the Q-factor and the resonance wavelength are changed according to the gaps d21 and d22 between the slots S21, S22, and S23. Accordingly, the optical unit device D20 may be appropriately designed and used to match the purpose thereof.

Table 3 below is a summary of values obtained from FIG. 9.

TABLE 3

3-Slot Structure (Structure of FIG. 8)

| Gap (d21, d22) (nm) | Peak Position (nm) | Peak Value | Q-factor |
|---|---|---|---|
| 550 | 1491 | 15.2 | 8.6 |
| 600 | 1504 | 16.1 | 9.3 |
| 650 | 1522 | 16.5 | 10.3 |
| 700 | 1541 | 15.8 | 10.4 |
| 750 | 1559 | 13.9 | 10.5 |
| 800 | 1578 | 11.4 | 10.2 |
| 850 | 1590 | 8.7 | 9.2 |

Referring to FIGS. 8 and 9 and the result of Table 3, a Q-factor of about 8 or more may be obtained in a range from about 550 nm to about 850 nm. A high Q-factor of about 10 or more may be obtained in a range from about 650 nm to 800 nm. Also, a peak value of about 8 or more may be obtained in a range from about 550 nm to about 850 nm. A peak value of about 11 or more may be obtained in a range from about 550 nm to about 800 nm. The peak value may correspond to the above-defined normalized transmittance. In the exemplary embodiment, to simultaneously obtain a Q-factor of about 10 or more and a peak value of about 11 or more, the gaps d21 and d22 between the slots S21, S22, and S23 may be determined in a range from about 650 nm to about 800 nm. However, appropriate ranges of the gaps d21 and d22 may vary according to the dimensions (length/width/thickness) of the slots S21, S22, and S23, the constituent material of the conductive material layer M20, the constituent material of the substrate SUB20, and the wavelength range of electromagnetic waves in use.

According to the exemplary embodiment, assuming that a resonance wavelength of the optical unit device D20 is λ and the refractive index of a medium (substrate) provided on (contacting) the incident surface of the conductive material layer M20 is n, the gaps d21 and d22 between the slots S21, S22, and S23 may be greater than $\lambda/(2.5 \times n)$. Also, the gaps d21 and d22 between the slots S21, S22, and S23 may be less than $\lambda/n$. The gaps d21 and d22 in a range of about 550 nm to about 850 nm in Table 3 satisfy the above requirements.

In the exemplary embodiments, metal or a metallic material may be used as the materials of the conductive material layers M10 and M20. For example, any one or any combination of Ag, Cu, Al, Ni, Fe, Co, Zn, Ti, Ru, Rh, Pd, Pt, Os, Ir, and Au, or an alloy including any one thereof, may be used as the materials of the conductive material layers M10 and M20. Also, two-dimensional materials exhibiting superior conductivity, such as, graphene, or a conductive compound, for example, a conductive oxide, may be used as the materials of the conductive material layers M10 and M20.

Each of the slots S11, S12, S21, S22, and S23 may have a hexahedral shape having the length L, the width W, and the thickness T, or a similar shape thereto. The length L may be less than the resonance wavelength λ. In this case, the slots S11, S12, S21, S22, and S23 may have a subwavelength size. In other words, the slots S11, S12, S21, S22, and S23 may have a subwavelength length. The width W may be less than the length L, and the thickness T may also be less than the length L. For example, the length L may be about 100 nm to about several micrometers (μm). The length L may be about 100 nm to about 3 μm, or about 100 nm to about 1500 nm. An appropriate length L may vary according to the wavelength range of interest, that is, an intended resonance wavelength. When the length L is equal to or less than about 1500 nm, the width W may be equal to or less than about 600 nm or equal to or less than about 300 nm and the thickness T may be equal to or less than about 1000 nm or equal to or less than about 700 nm. However, when the range of the appropriate length L varies, the ranges of an appropriate width W and an appropriate thickness T may vary accordingly. The gap between two adjacent slots may be determined to be several micrometers (μm) or less.

The conductive material layers M10 and M20 including the slots S11, S12, S21, S22, and S23 may generate surface plasmon by the electromagnetic waves incident thereon. In this regard, the conductive material layers M10 and M20 or the slots S11, S12, S21, S22, and S23 may be referred to as the "plasmonic structure." When the slots S11, S12, S21, S22, and S23 have a nanoscale, it may be called a nanoantenna.

Slits used in a general slit array method have optically different properties from the slots used in the exemplary embodiments. A slit has a length much longer than a resonance wavelength, and the resonance wavelength (resonance frequency) may not be defined by using a single slit. To define the resonance wavelength (resonance frequency) using a slit array, many slits, for example, about ten slits, are used. A resonance mode is generated not from each slit, but from a slit array. Accordingly, a relatively large space may be used to define a resonance wavelength using a slit array. When grooves are used, many grooves constituting a groove array may be used to define the resonance wavelength like the slits. Also, when a slit array or a groove array is in use, electromagnetic waves pass through one slit or hole located at the center and thus transmission efficiency may be lowered.

In contrast, the slot used in the exemplary embodiments may have a length shorter than the resonance wavelength, and the resonance wavelength (resonance frequency) may be defined by using one slot. Also, when a plurality of slots are used and the gap between the slots are controlled, electromagnetic waves pass through each slot and the electromagnetic waves having passed the slots are reinforced through interaction, and thus a high Q-factor and a high transmission efficiency may be obtained. Also, because slots of about six or less or about four or less are included in a single unit device, a unit device (spectral unit device) of a small size may be easily implemented. Accordingly, a unit device (spectral unit device) having a size smaller than a pixel used in a general pixel array may be implemented. When the unit device according to the exemplary embodiment is used, a compact/ultra compact optical device, for example, a spectrometer, may be easily implemented.

Figure 10:
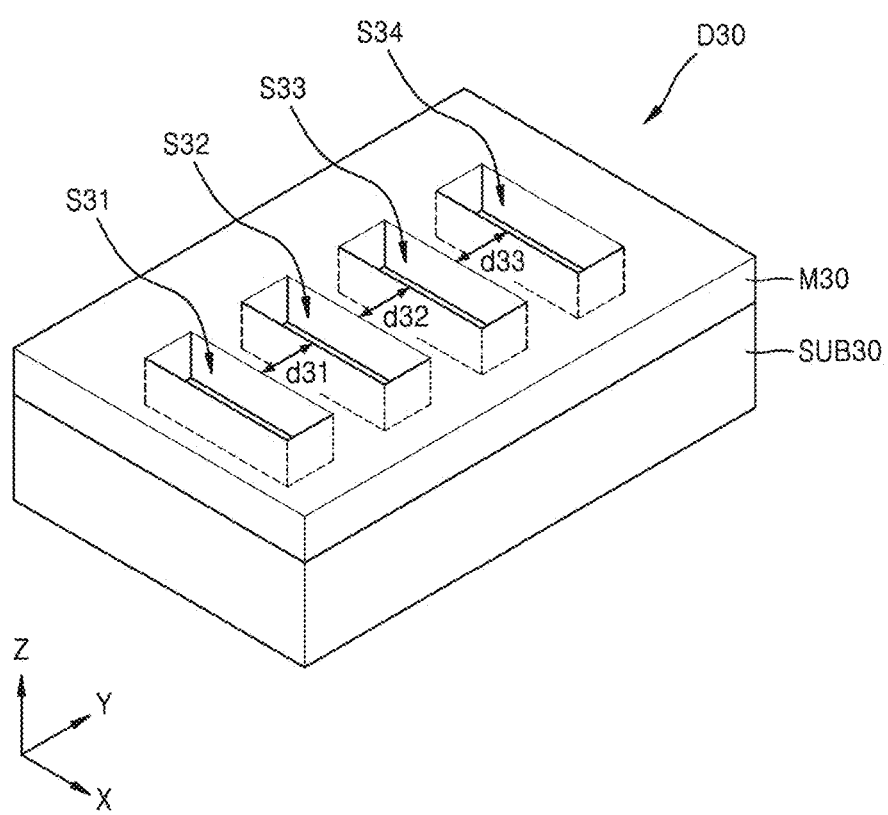
FIG. 10 is a perspective view of an optical unit device according to another exemplary embodiment.

FIG. 10 is a perspective view of an optical unit device D30 according to another exemplary embodiment.

Referring to FIG. 10, the optical unit device D30 may include a conductive material layer M30 where four slots S31, S32, S33, and S34 are formed. A first slot S31 may be spaced apart from the second slot S32 by a first gap d31. The second slot S32 may be spaced apart from the third slot S33 by a second gap d32. The third slot S33 may be spaced apart from the fourth slot S34 by a third gap d33. The first to fourth slots S31, S32, S33, and S34 may be arranged parallel to one another by substantially the same gap. However, this is an example and the arrangement of the slots S31, S32, S33, and S34 may be variously changed. The conductive material layer M30 may be arranged on a substrate SUB30. The materials of the conductive material layer M30 and the substrate SUB30 may be the same as or similar to those described in FIG. 3.

Figure 11:
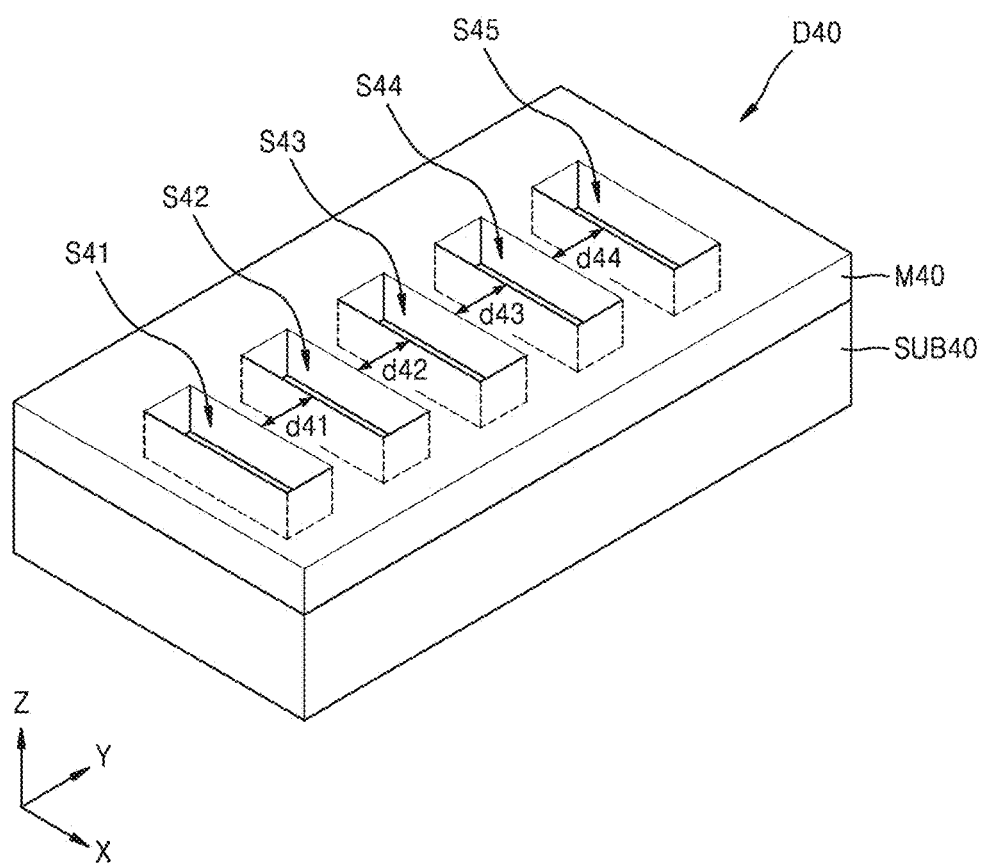
FIG. 11 is a perspective view of an optical unit device according to another exemplary embodiment.

FIG. 11 is a perspective view of an optical unit device D40 according to another exemplary embodiment.

Referring to FIG. 11, the optical unit device D40 may include a conductive material layer M40 where five slots S41, S42, S43, S44, and S45 are formed. The first slot S41 may be spaced apart from the second slot S42 by a first gap d41. The second slot S42 may be spaced apart from the third slot S43 by a second gap d42. The third slot S43 may be spaced apart from the fourth slot S44 by a third gap d43. The fourth slot S44 may be spaced apart from the fifth slot S45 by a fourth gap d44. The conductive material layer M40 may be arranged on a substrate SUB40.

Although a case in which the optical unit device includes five or less number of slots, in some cases, the optical unit device may include six or more number of slots.

A method of setting a range of the gap d10 in the structure (2-slot structure) including the two slots S11 and S12 as illustrated in FIG. 3 is exemplarily described as follows.

When the length (length of a long side) and the width (length of a short side) of each of the slots S11 and S12 are L and W, respectively, and a refractive index of the substrate SUB 10 (medium) is n, a range of the gap d10 satisfying the requirements of the Q-factor and transmittance of the optical unit device D10 may be expressed by Mathematical Expression 2 below. The thickness (height) of each of the slots S11 and S12 is assumed to be about 300 nm.

$$d = \left(1.55 \times \frac{L}{n} - W\right) \sim \left(2.1 \times \frac{L}{n} - W\right) \quad \text{[Mathematical Expression 2]}$$

In the 2-slot structure including two slots, when a gap d (d10 of FIG. 3) between two slots satisfies Mathematical Expression 2, the optical unit device D10 may have high Q-factor and high transmittance.

In the structure (2-slot structure) including the two slots S11 and S12 as illustrated in FIG. 3, a relation may be established between the gap d10 and the resonance wavelength λ. For example, when the wavelength range of interest is a near-infrared (IR) range around 1.5 μm (1500 nm), Mathematical Expression 3 may be established between the resonance wavelength λ and the gap d10.

$$\frac{\lambda_{shift}}{\lambda_{single}} \approx 0.15 \cdot n^2 \cdot \left(\frac{\text{gap}}{\lambda_{single}} - 0.4\right) \quad \text{[Mathematical Expression 3]}$$

In Mathematical Expression 3, "$\lambda_{single}$" denotes a resonance wavelength when one slot, for example, the slot S11, exists, and "$\lambda_{shift}$" denotes an amount of a change in the resonance wavelength when the two slots S11 and S12 are used. Accordingly, the resonance wavelength A when the two slots S11 and S12 are used may be "$\lambda_{single} + \lambda_{shift}$." "n" denotes a refractive index of the substrate SUB10 (medium). When the dimensions (length/width/thickness) of a slot, for example, the slot S11, are determined, $\lambda_{single}$ may be determined accordingly. In a state in which the refractive index n is determined, $\lambda_{shift}$ may vary according to the gap. Accordingly, the resonance wavelength λ according to the gap may be obtained.

Figure 12:
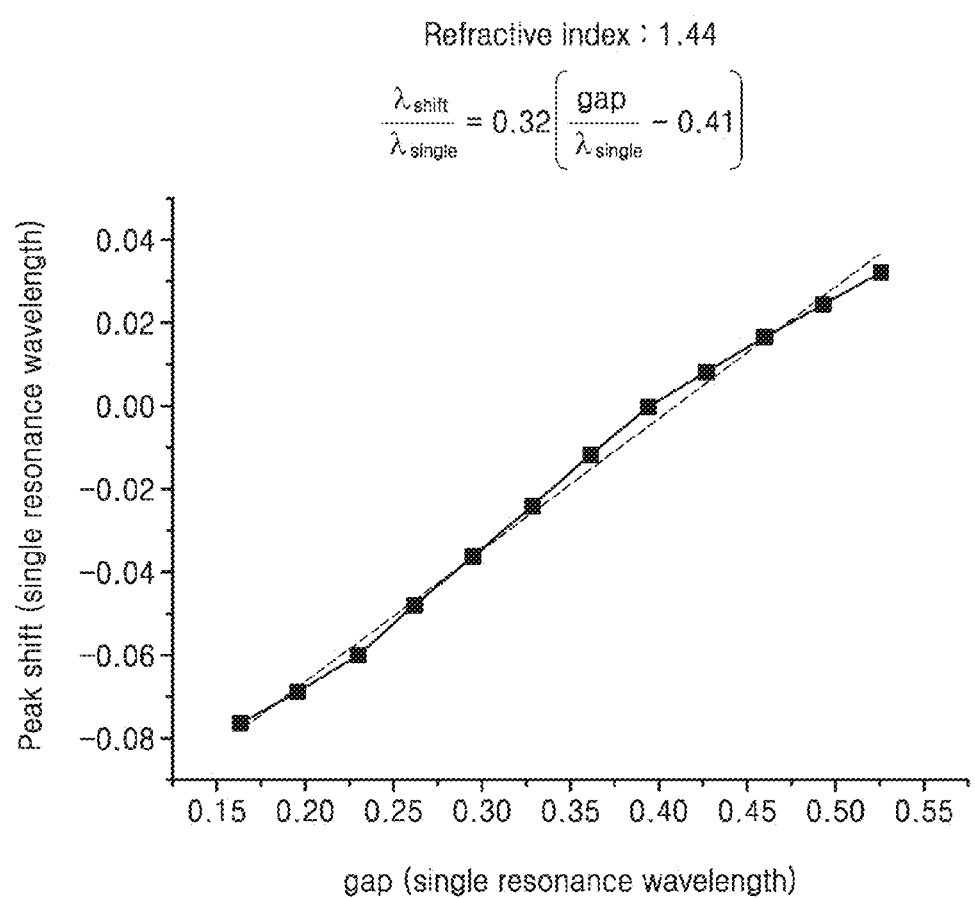
FIGS. 12 and 13 are graphs of a relationship between a gap between two slots and a peak shift $\lambda_{shift}$, according to exemplary embodiments.
Figure 13:
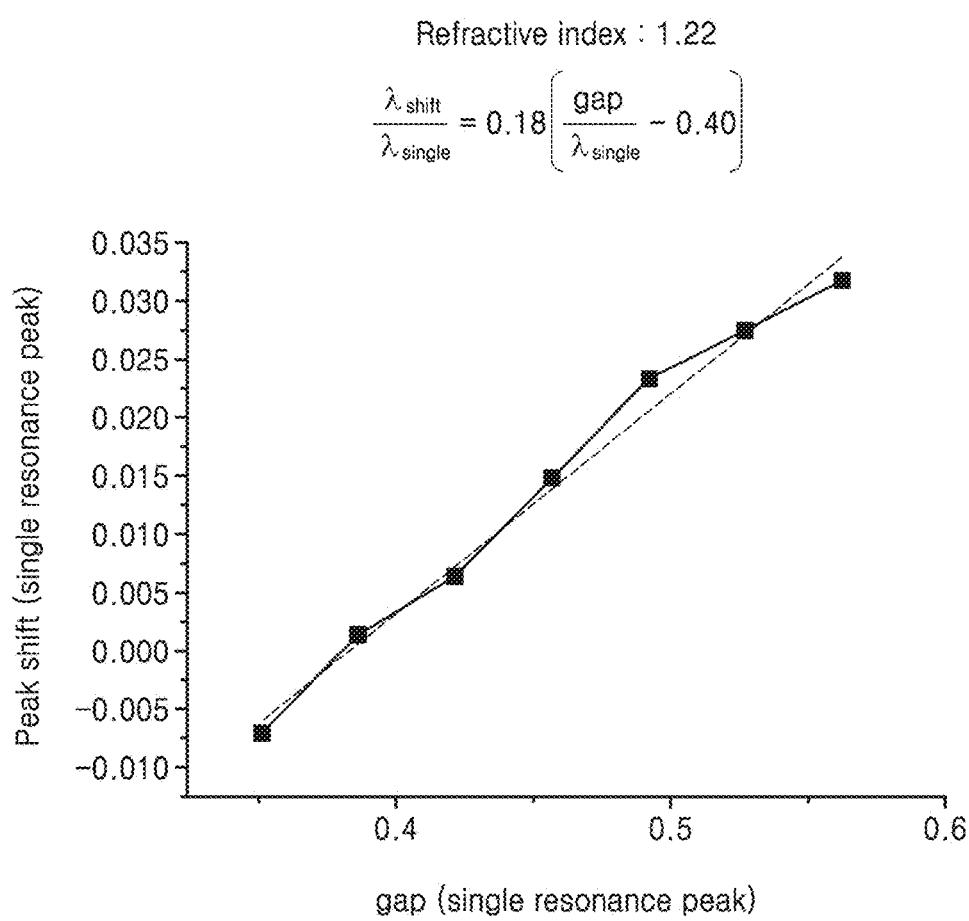

FIGS. 12 and 13 are graphs of a relationship between a gap between two slots and a peak shift ($\lambda_{shift}$) when the refractive index n of the medium (substrate) is 1.44 and 1.22, respectively, according to exemplary embodiments. FIGS. 12 and 13 respectively include relations when the refractive index n is 1.44 and 1.22. Referring to FIGS. 12 and 13, the gap in the wavelength range of interest may be proportional to $\lambda_{shift}$. In both of FIGS. 12 and 13, the wavelength range of interest is a near-IR range around 1.5 μm (1500 nm).

Figure 14:
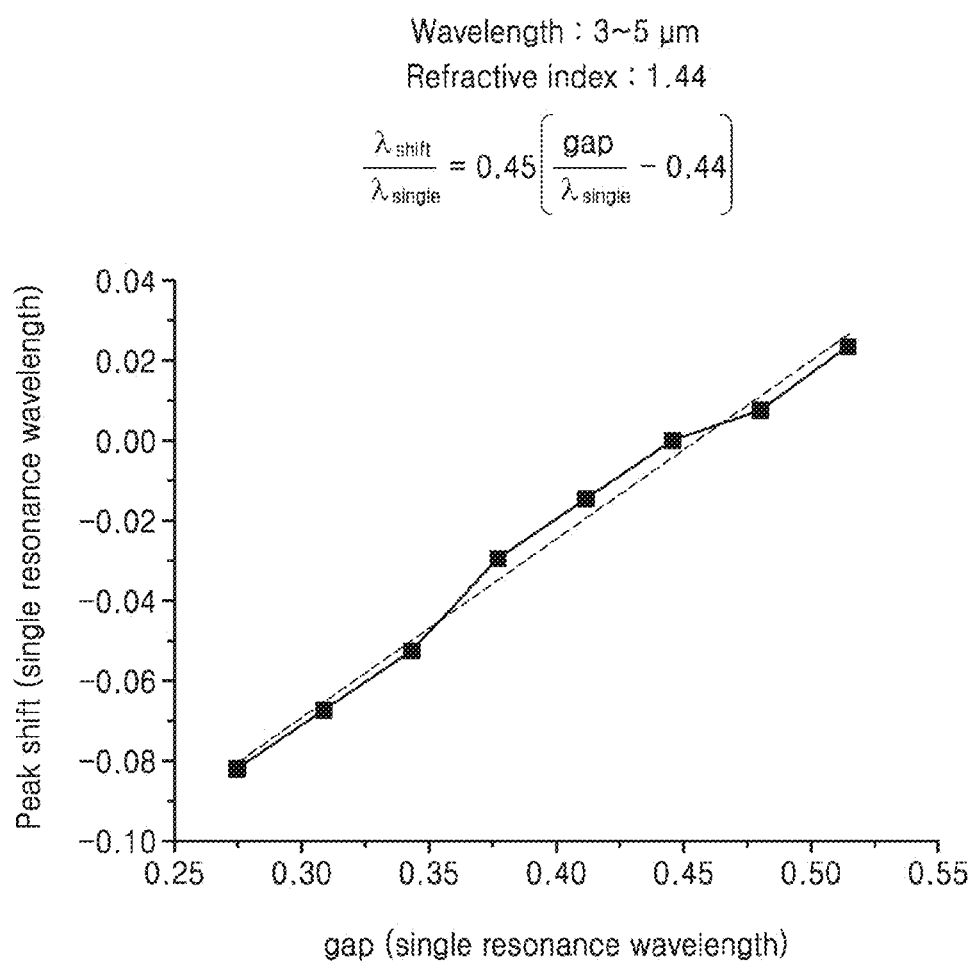
FIG. 14 is a graph of a relationship between a gap between two slots and a peak shift $\lambda_{shift}$ in a mid-IR range, for a 2-slot type optical unit device, according to an exemplary embodiment.

FIG. 14 is a graph of a relationship between a gap between two slots and a peak shift ($\lambda_{shift}$) in a mid-IR range, for a 2-slot type optical unit device, according to an exemplary embodiment. The range of a wavelength is about 3-5 μm, and the refractive index n of the medium (substrate) is 1.44.

Figure 15:
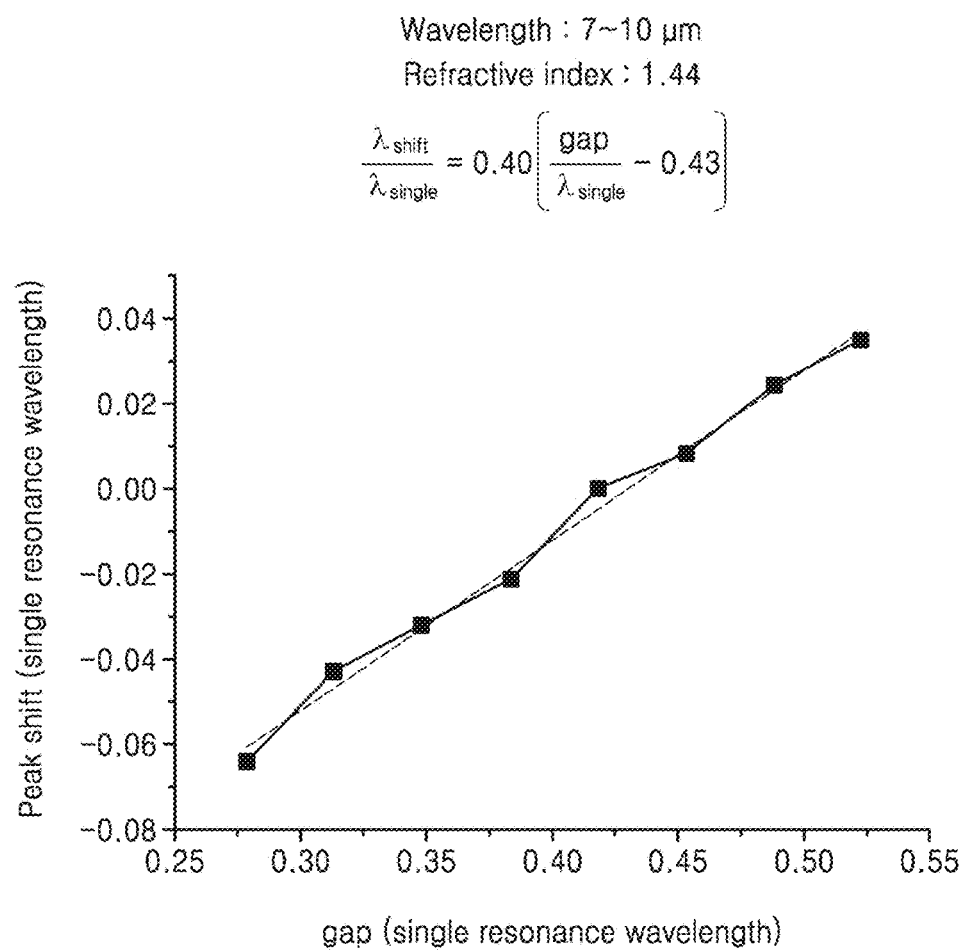
FIG. 15 is a graph of a relationship between a gap between two slots and a peak shift $\lambda_{shift}$ in a far-IR range, for a 2-slot type optical unit device, according to an exemplary embodiment.

FIG. 15 is a graph of a relationship between a gap between two slots and a peak shift ($\lambda_{shift}$) in a far-IR range, for a 2-slot type optical unit device. The range of a wavelength is about 7-10 μm, and the refractive index n of the medium (substrate) is 1.44.

As illustrated in FIGS. 14 and 15, when a wavelength range varies, the relation between the gap and $\lambda_{shift}$, that is, the relation between the gap and the resonance wavelength λ, may vary. However, in FIGS. 14 and 15, as the gap increases, $\lambda_{shift}$ increases as well.

FIGS. 16A, 16B, and 16C are images of simulation data for a structure (2-slot structure) having two slots as illustrated in FIG. 3, in which FIG. 16B shows a case in which the gap satisfies a resonance requirement and FIGS. 16A and 16C show cases in which the gap does not satisfy the resonance requirement. The resonance requirement denotes that the electromagnetic wave passing through two slots are reinforced by interaction and/or coherence.

When the gap between two slots satisfies the resonance requirement as in FIG. 16B, the Q-factor and the transmittance may be much improved. In this state, the gap between two slots is about 650 nm. When the gap between two slots does not satisfy the resonance requirement as in FIGS. 16A and 16C, it is difficult to obtain a high Q-factor and a high transmittance.

Figure 17:
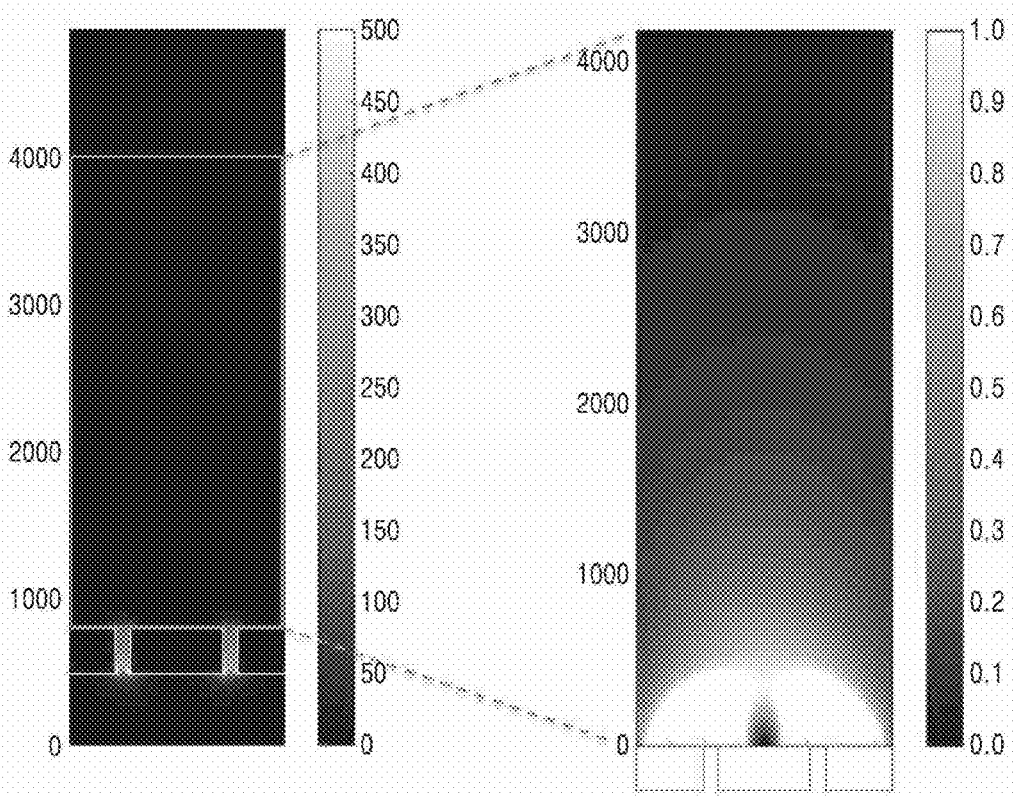
FIG. 17 is a graph of an intensity profile of electromagnetic waves passing through two slots, according to an exemplary embodiment.

FIG. 17 is a graph of an intensity profile of electromagnetic waves passing through two slots, according to an exemplary embodiment. The gap between two slots is about 650 nm, the resonance wavelength is about 1535 nm, and the refractive index of a substrate is about 1.44.

Figure 18:
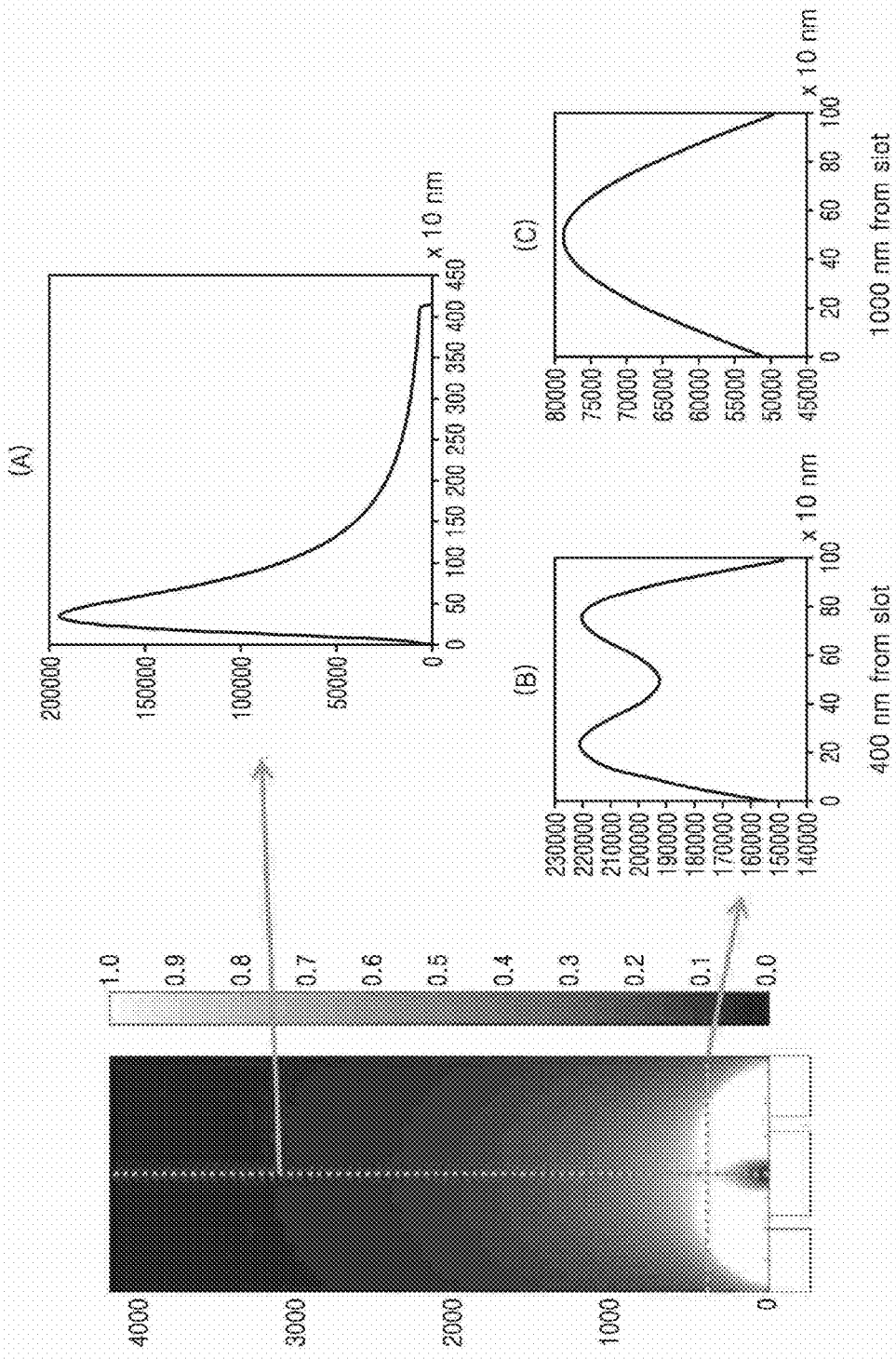
FIG. 18 is a set of graphs of intensity profiles in vertical and horizontal directions of electromagnetic waves passing through two slots of FIG. 17.

FIG. 18 is a set of graphs of intensity profiles in vertical and horizontal directions of electromagnetic waves passing through two slots of FIG. 17. In FIG. 18, a graph (A) shows a vertical profile along a center perpendicular line, a graph (B) shows a horizontal profile at a distance of 400 nm from a slot, and a graph (C) shows a horizontal profile at a distance of 1000 nm from the slot. According to the graph (A) of FIG. 18, intensity of transmissive electromagnetic waves at a distance between about 100-1000 nm, for example, a distance between about 150-850 nm, from a material layer where a plurality of slots are formed is high. This information may be used to determine, for example, the position of a detector for detecting transmissive electromagnetic waves. According to the graphs (B) and (C) of FIG. 18, the horizontal profile varies according to the distance from a slot. A profile of transmissive electromagnetic waves may vary according to the wavelength condition, the number and size of slots, or the gap between slots.

FIGS. 19A and 19B are plan views of two types of optical unit devices according to exemplary embodiments.

FIG. 19A illustrates a case in which a plurality of slots S10a and S10b extending in a first direction, for example, an X-axis direction, are formed in a conductive material layer M11. FIG. 19B illustrates a case in which a plurality of slots S20a and S20b extending in a second direction, for example, a Y-axis direction, are formed in the conductive material layer M11. The slots S10a and S10b of FIG. 19A may relatively well transmit electromagnetic waves polarized in the Y-axis direction compared to electromagnetic waves polarized in the X-axis direction. In contrast, the slots S20a and S20b of FIG. 19B may relatively well transmit electromagnetic waves polarized in the X-axis direction compared to the electromagnetic waves polarized in the Y-axis direction. In other words, the optical unit device may have polarization dependency according to the direction in which slots are formed (extended).

According to an exemplary embodiment, the structure of FIG. 19A or 19B may be applied to one optical unit device.

Figure 20:
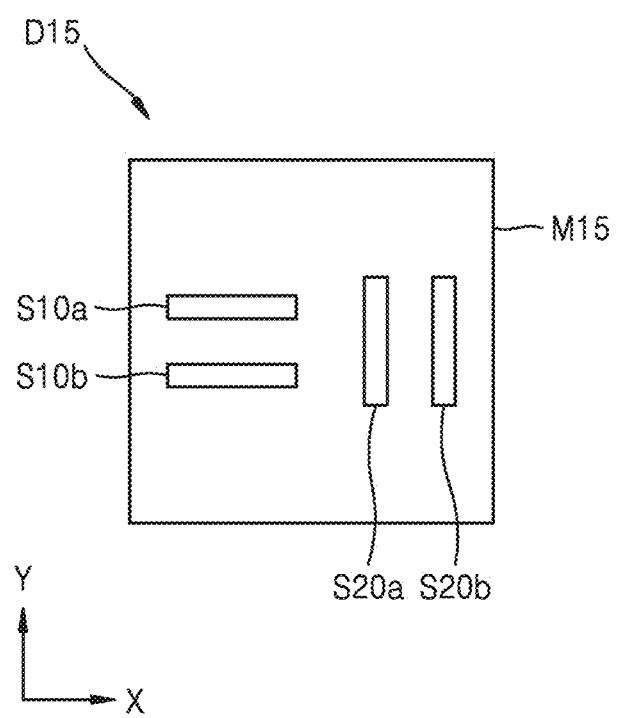
FIG. 20 is a plan view of an optical unit device according to another exemplary embodiment.
Figure 21:
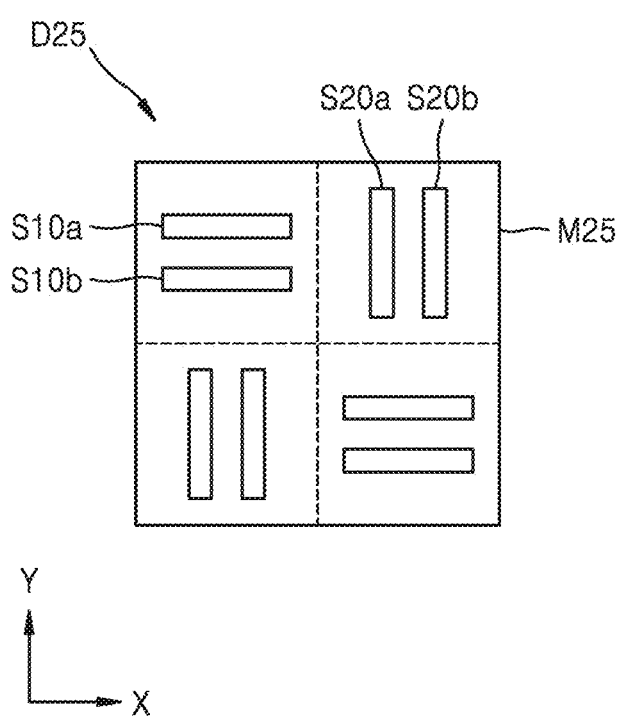
FIG. 21 is a plan view of an optical unit device according to another exemplary embodiment.
Figure 22:
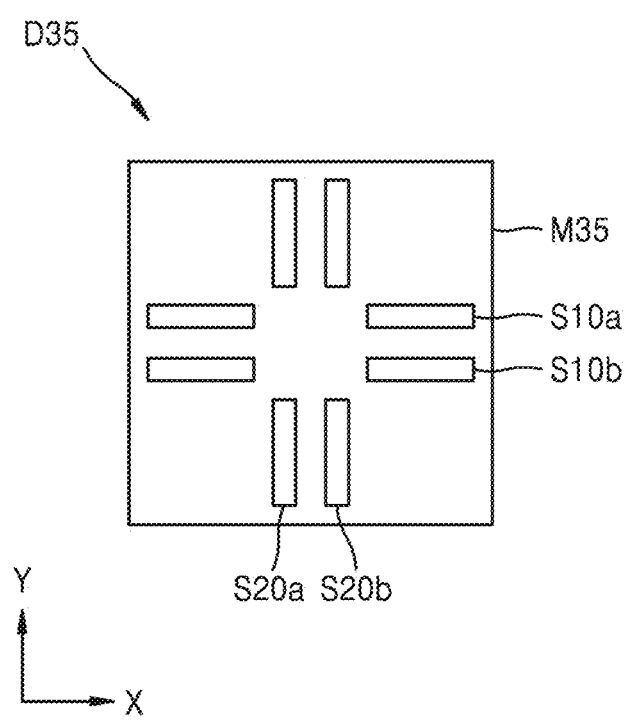
FIG. 22 is a plan view of an optical unit device according to another exemplary embodiment.

According to another exemplary embodiment, the structures of FIGS. 19A and 19B may be mixedly applied to one optical unit device, and examples thereof are illustrated in FIGS. 20 to 22.

FIG. 20 is a plan view of an optical unit device D15 according to another exemplary embodiment.

Referring to FIG. 20, the optical unit device D15 may include a conductive material layer M15 and a plurality of slots S10a, S10b, S20a, and S20b formed in the conductive material layer M15. The slots S10a, S10b, S20a, and S20b may include the first slots S10a and S10b extending in the X-axis direction and the second slots S20a and S20b extending in the Y-axis direction. The first slots S10a and S10b may correspond to the slots S10a and S10b of FIG. 19A, and the second slots S20a and S20b may correspond to the slots S20a and S20b of FIG. 19B. The second slots S20a and S20b may be arranged perpendicular to the first slots S10a and S10b. As such, when both of the first slots S10a and S10b extending in the X-axis direction and the second slots S20a and S20b extending in the Y-axis direction are included in the optical unit device D15, an electromagnetic wave component polarized in the X-axis direction and an electromagnetic wave component polarized in the Y-axis direction are effectively transmitted so that light efficiency may be improved.

Superior optical coupling properties may exist between the first slots S10a and S10b, and similarly, superior optical coupling properties may exist between the second slots S20a and S20b. Interaction between the first slots S10a and S10b and the second slots S20a and S20b may be relatively very weak. Accordingly, even when the first slots S10a and S10b and the second slots S20a and S20b exist together, the first slots S10a and S10b may improve transmission properties and the second slots S20a and S20b may improve transmission properties, whereas the interaction between the first slots S10a and S10b and the second slots S20a and S20b may be hardly generated.

FIG. 21 is a plan view of an optical unit device D25 according to another exemplary embodiment.

Referring to FIG. 21, the optical unit device D25 may include a conductive material layer M25. The conductive material layer M25 may be sectioned (divided) into a plurality of regions. Each of the regions may include a plurality of slots S10a and S10b parallel to each other, or a plurality of slots S20a and S20b parallel to each other. For example, at least one of the regions may include the first slots S10a and S10b extending in the X-axis direction, and at least another of the regions may include the second slots S20a and S20b extending in the Y-axis direction. Although the conductive material layer M25 is equally divided into four regions and the first slots S10a and S10b and the second slots S20a and S20b are alternatively arranged clockwise from the upper left region, this is an example and the arrangement method may be variously changed.

FIG. 22 is a plan view of an optical unit device D35 according to another exemplary embodiment.

Referring to FIG. 22, the optical unit device D35 may include a conductive material layer M35. The conductive material layer M35 may be sectioned (divided) into a plurality of regions. Each of the regions may include a plurality of slots S10a and S10b parallel to each other, or a plurality of slots S20a and S20b parallel to each other. For example, the conductive material layer M35 may be sectioned into upper, lower, left, and right regions with respect to a center portion thereof, and the slots S10a and S10b or S20a and S20b may be arranged in the respective upper, lower, left, and right regions. In a detailed example, the first slots S10a and S10b may be arranged in each of the left and right regions with respect to the center portion, and the second slots S20a and S20b may be arranged in each of the upper and lower regions with respect to the center portion. In this case, the first slots S10a and S10b and the second slots S20a and S20b may substantially have a cross shape. Alternatively, the first slots S10a and S10b may be arranged in each of the upper and lower regions with respect to the center portion of the conductive material layer M35, the second slots S20a and S20b may be arranged in each of the left and right regions with respect to the center portion of the conductive material layer M35.

Figure 23:
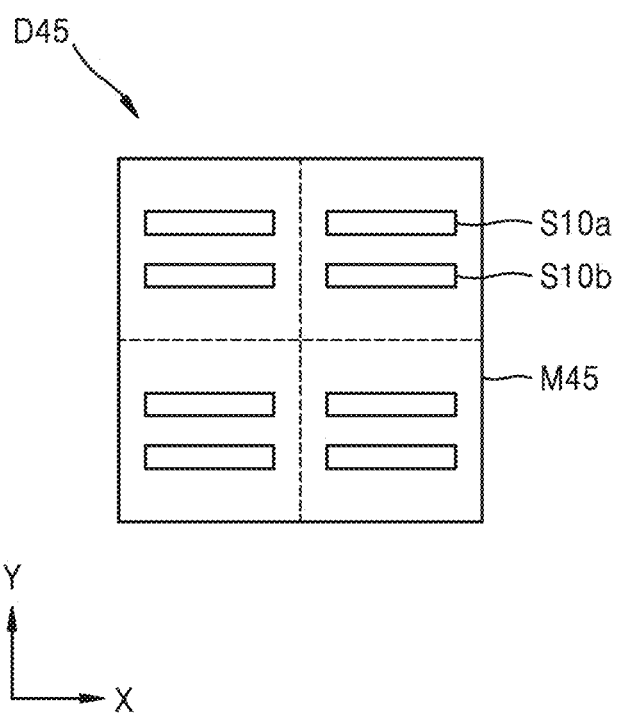
FIG. 23 is a plan view of an optical unit device according to another exemplary embodiment.

FIG. 23 is a plan view of an optical unit device D45 according to another exemplary embodiment.

Referring to FIG. 23, the optical unit device D45 may be sectioned (divided) into a plurality of regions. Each of the regions may include a plurality of slots S10a and S10b arranged in the same direction. For example, each of the regions may include the first slots S10a and S10b. When incident electromagnetic waves are polarized in one direction, the optical unit device D45 of FIG. 23 may be used. For example, when the incident electromagnetic waves are polarized in the Y-axis direction, the optical unit device D45 of FIG. 23 may be used. When the incident electromagnetic waves are polarized in the X-axis direction, the second slots S20a and S20b of FIG. 19 instead of the first slots S10a and S10b may be used.

The optical unit devices according to the above-described exemplary embodiments may be arranged in a plural number in two dimensions. In other words, a plurality of optical unit devices may be arrayed, and examples thereof are illustrated in FIGS. 24 and 25.

Figure 24:
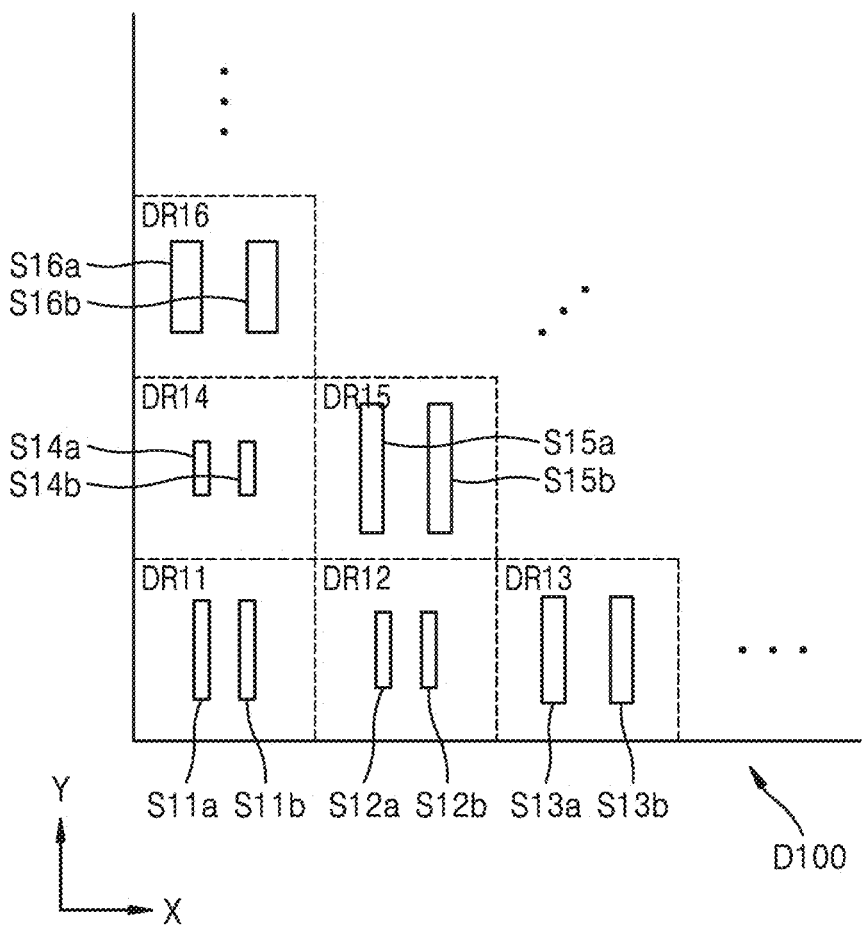
FIG. 24 is a plan view of an optical device (array device) including a plurality of optical unit devices, according to an exemplary embodiment.

FIG. 24 is a plan view of an optical device (array device) D100 including a plurality of optical unit devices, according to an exemplary embodiment.

Referring to FIG. 24, the optical device (array device) D100 may include a plurality of unit device regions DR11, DR12, DR13, DR14, DR15, and DR16 arranged in two dimensions. Each of the unit device regions DR11-DR16 may be configured to transmit electromagnetic waves of a wavelength range. The unit device regions DR11-DR16 may respectively include a plurality of slots S11a and S11b, S12a and S12b, S13a and S13b, S14a and S14b, S15a and S15b, and S16a and S16b. The unit device regions DR11-DR16 may include the first unit device region DR11 and the second unit device region DR12. The slots S11a and S11b constituting the first unit device region DR11 and the slots S12a and S12b constituting the second unit device region DR12 may have different dimensions and/or different gaps from each other. Accordingly, the first unit device region DR11 may be configured to transmit electromagnetic waves of a first wavelength range, and the second unit device region DR12 may be configured to transmit electromagnetic waves of a second wavelength range different from the first wavelength range. The resonance wavelength may vary according to the dimensions, such as length, width, and thickness, of a plurality of slots constituting one unit device region, and the Q-factor and the transmittance may vary according to the gap of the slots. Also, the gap of the slots may considerably affect the resonance wavelength. As such, at least two of the unit device regions DR11-DR16 may be configured to transmit electromagnetic waves of different wavelength ranges. The unit device regions DR11-DR16 may be all configured to transmit electromagnetic waves of different wavelength ranges. In some cases, however, at least two of the unit device regions DR11-DR16 may be configured to transmit electromagnetic waves of substantially the same wavelength range.

Figure 25:
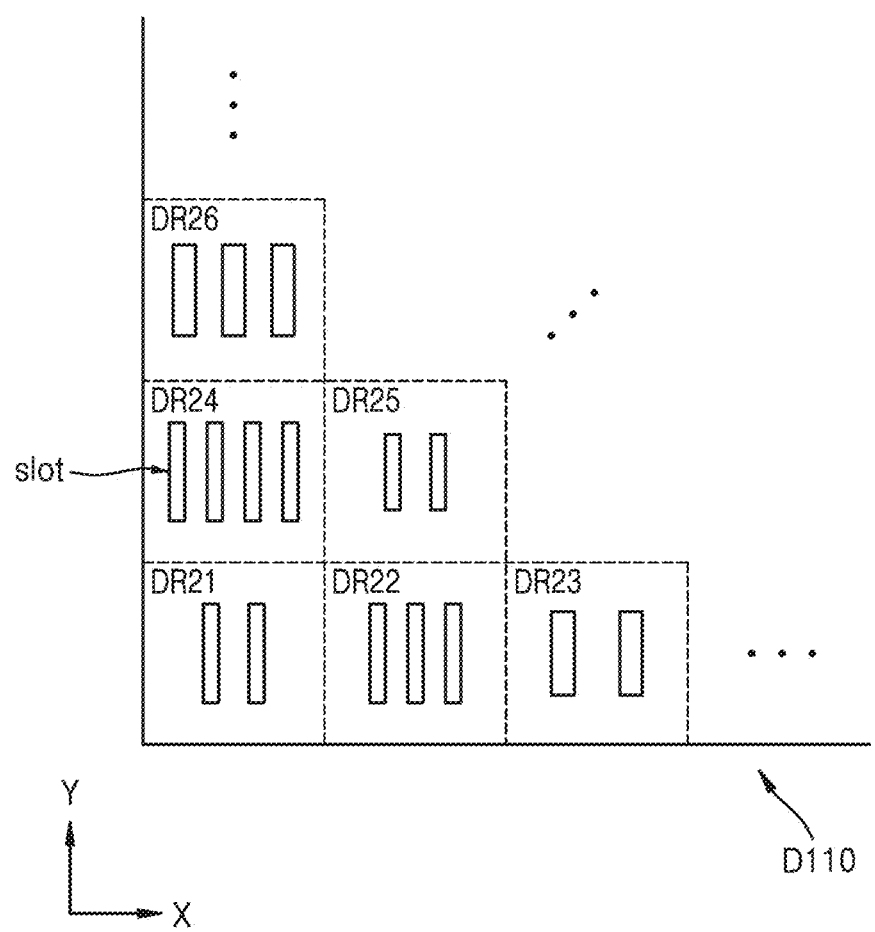
FIG. 25 is a plan view of an optical device (array device) including a plurality of optical unit devices, according to another exemplary embodiment.

Although FIG. 24 illustrates a case in which each of the unit device regions DR11-DR16 includes two slots, for example, the slots S11a and S11b of DR11, according to another exemplary embodiment, at least two of the unit device regions DR11-DR16 may include different numbers of slots, and an example thereof is illustrated in FIG. 25.

FIG. 25 is a plan view of an optical device (array device) D110 including a plurality of optical unit devices, according to another exemplary embodiment.

Referring to FIG. 25, at least two of a plurality of unit device regions DR21, DR22, DR23, DR24, DR25, and DR26 constituting an optical device (array device) D110 may include different numbers of slots. The properties of the unit device regions DR21-DR26 may be variously controlled through the control of the number of slots, the gap between slots, and the dimensions (length/width/thickness) of slots. As such, when the number of slots is included in variables, the properties control of the unit device regions DR21-DR26 may be further facilitated.

The optical devices (array devices) D100 and D110 described with reference to FIGS. 24 and 25 may form a sort of a metasurface or a metamaterial structure. As a plurality of slots are formed in each unit device region in one conductive material layer, for example, a metal layer, the optical devices D100 and D110 as illustrated in FIGS. 24 and 25 may be easily manufactured. The slots may be easily formed by using a lithography process. Accordingly, the optical devices D100 and D110 may be easily manufactured. In FIGS. 24 and 25, each of the unit device regions DR11-DR16 and DR21-DR26 may correspond to one pixel region.

Figure 26:
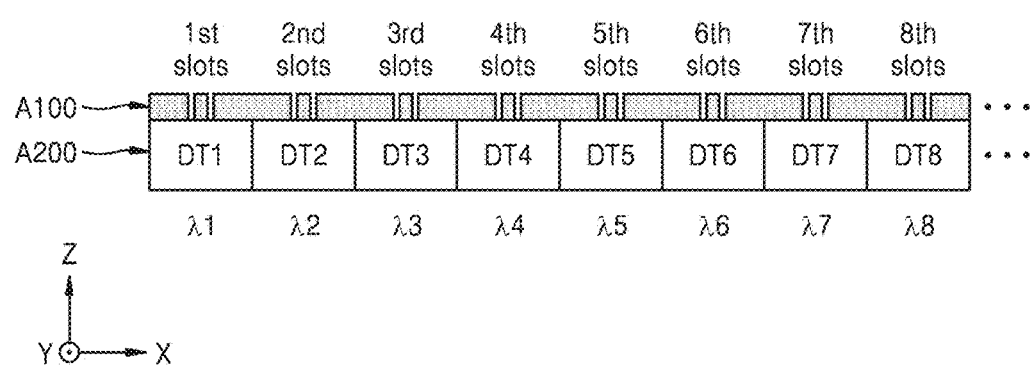
FIG. 26 is a cross-sectional view of a spectral device employing an optical device (optical unit device) according to an exemplary embodiment.

FIG. 26 is a cross-sectional view of a spectral device employing an optical device (optical unit device) according to an exemplary embodiment.

Referring to FIG. 26, a first array device portion A100 may include a plurality of optical unit devices. The first array device portion A100 may correspond to, for example, the optical devices (array devices) D100 and D110 described with reference to FIGS. 24 and 25, or an optical device (array device) modified therefrom. Also, at least two of the optical unit devices constituting the first array device portion A100 may be configured to transmit electromagnetic waves of different wavelength ranges. Each of the optical unit devices constituting the first array device portion A100 may include a plurality of slots. At least two of the optical unit devices, for example, slots constituting a first optical unit device and slots constituting a second optical unit device, may have different dimensions (length/width/thickness) and/or having different gaps. For example, first slots constituting the first optical unit device and second slots constituting the second optical unit device may have different dimensions and/or different gaps. Although the sizes and gaps of the first slots to the eighth slots are illustrated to be similar to each other for convenience of explanation, the first slots to the eighth slots may actually have different sizes and/or gaps.

A second array device portion A200 may include a plurality of detectors (optical detectors) DT1, DT2, DT3, DT4, DT5, DT6, DT7, and DT for detecting electromagnetic waves passing through the first array device portion A100. The detectors DT1-DT8 may one-to-one (1:1) correspond to the optical unit devices of the first array device portion A100. The detectors DT1-DT8 may be referred to as a sort of pixels. The detectors DT1-DT8 may include various types of unit devices (sensors) for converting incident light (incident electromagnetic waves) to electric signals. For example, the detectors DT1-DT8 may include photodiodes or charge coupled devices (CCD) or complementary metal oxide semiconductor (CMOS) devices. The detectors DT1-DT8 may detect light of different wavelength ranges λ1-λ8. However, the detailed structures of the detectors DT1-DT8 are exemplary and may be variously changed. Also, at least two of the detectors DT1-DT8 may be configured to detect light of the same wavelength range.

Figure 27:
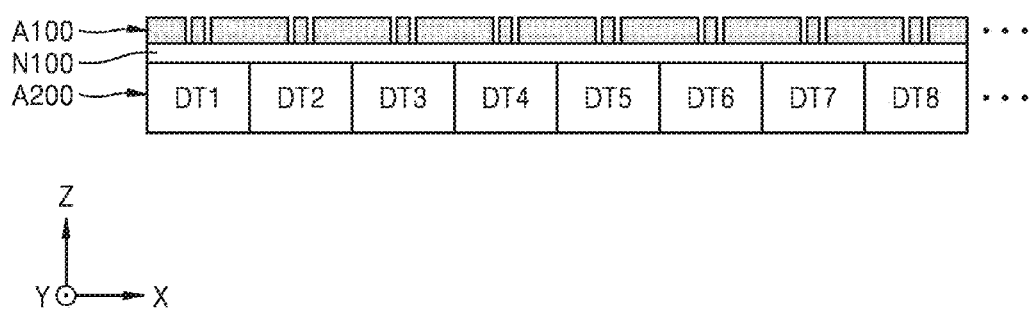
FIG. 27 is a cross-sectional view of a spectral device employing an optical device (optical unit device) according to another exemplary embodiment.

FIG. 27 is a cross-sectional view of a spectral device employing an optical device (optical unit device) according to another exemplary embodiment.

According to another exemplary embodiment, as illustrated in FIG. 27, an intermediate layer N100 may be further provided between the first array device portion A100 and the second array device portion A200. The intermediate layer N100 may control a gap between the first array device portion A100 and the second array device portion A200. The thickness of the intermediate layer N100 may be about several nanometers to several thousands of nanometers, for example, about 10 nm to about 2000 nm. The intermediate layer N100 may include a transparent material with respect to electromagnetic waves of a wavelength range of interest. The intermediate layer N100 may be a substrate material or another material layer that is not the substrate.

Figure 28:
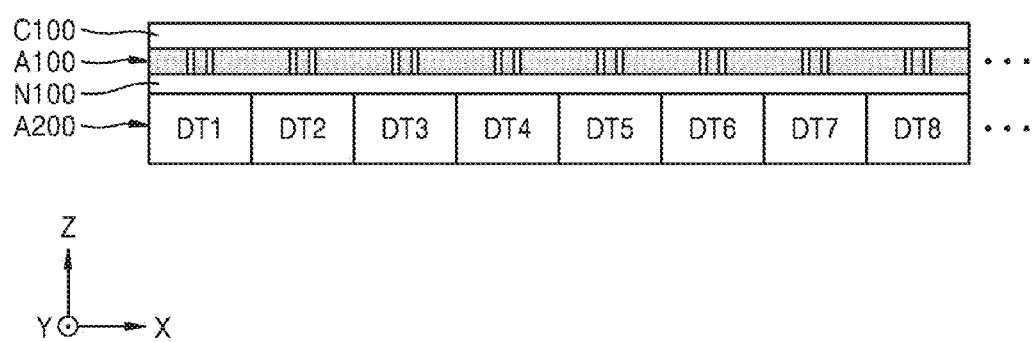
FIG. 28 is a cross-sectional view of a spectral device employing an optical device (optical unit device) according to another exemplary embodiment.

FIG. 28 is a cross-sectional view of a spectral device employing an optical device (optical unit device) according to another exemplary embodiment.

According to another exemplary embodiment, as illustrated in FIG. 28, a cover layer C100 may be further provided on the first array device portion A100. The cover layer C100 may protect the first array device portion A100. The cover layer C100, similar to the intermediate layer N100, may include a transparent material with respect to electromagnetic waves of a wavelength range of interest. The cover layer C100 may be a sort of a substrate or another material layer that is not the substrate. In the structure of FIG. 28, in some cases, the intermediate layer N100 may not be used.

Figure 29:
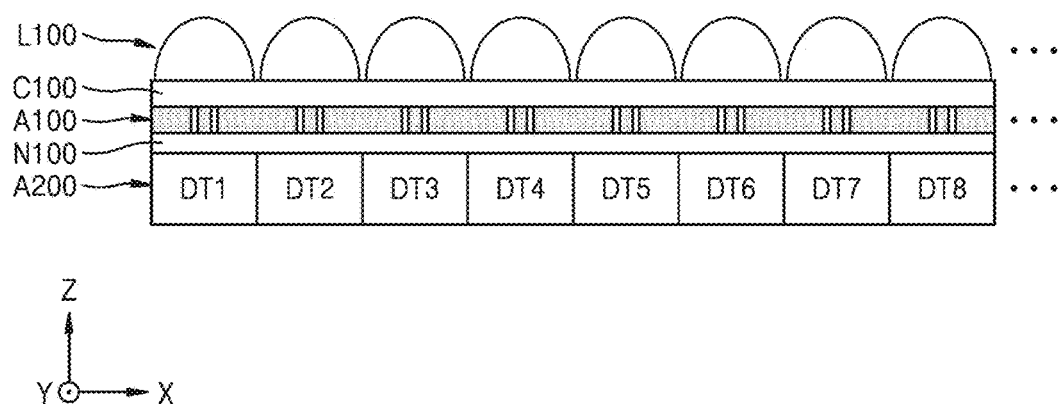
FIG. 29 is a cross-sectional view of a spectral device employing an optical device (optical unit device) according to another exemplary embodiment.

FIG. 29 is a cross-sectional view of a spectral device employing an optical device (optical unit device) according to another exemplary embodiment.

According to another exemplary embodiment, as illustrated in FIG. 29, a focusing element array L100 may be further provided on the first array device portion A100. The focusing element array L100 may be, for example, a microlens array. Although the cover layer C100 may be provided between the first array device portion A100 and the focusing element array L100, in some cases, the cover layer C100 may not be used. Also, the structure of the focusing element array L100 is exemplary and may be variously changed.

A spectral device (spectrometer) having the structure as illustrated in FIGS. 26 to 29 may have a small size less than several cm × several cm, or a size of several mm × several mm or less. In this state, a size of each of the detectors DT1-DT8, that is, a pixel size may be tens of micrometers or less or several micrometers or less. The pixel size may be as small as about 1 μm or less. According to exemplary embodiments, because a high Q-factor and superior light efficiency may be obtained by spacing a relatively small number of slots by an appropriate gap to correspond to one pixel region, compact/ultra compact spectral device (spectrometer) having high performance may be easily implemented.

Additionally, in the exemplary embodiments, the optical unit device including a plurality of slots, and the optical device (array device) including a plurality of optical unit devices may have a thickness that is less than the resonance wavelength, that is, a subwavelength thickness. For example, the thickness of the optical unit device and optical device (array device) may be about 1 μm (1000 nm) or less. In an example, when the resonance wavelength is about 1.5 μm (1500 nm), the thickness of the optical unit device may be about 300 nm. In this state, the thickness of the optical device (array device) including a plurality of optical unit devices may be about 300 nm. As the length of a wavelength of interest increases, the thickness of the optical unit device may be reduced. A material film including a plurality of slots may be used as the optical unit device and the optical device (array device). Because the optical unit device or the optical device (array device) may be used as an optical filter or a spectral device, the thickness of the optical filter or the spectral device may be the subwavelength thickness. This may be tens of times to hundreds of times thinner than the thickness of an existing optical filter or spectral device. Accordingly, according to the exemplary embodiment, the optical device having a thin thickness (very thin thickness) and superior properties may be easily implemented.

Figure 30:
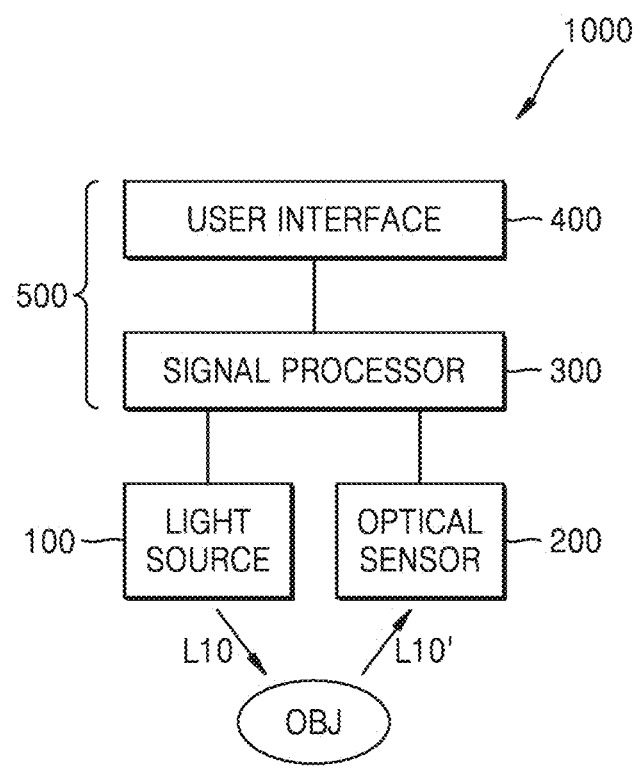
FIG. 30 is a schematic block diagram of an optical measurement apparatus employing a spectral device according to an exemplary embodiment.

FIG. 30 is a schematic block diagram of an optical measurement apparatus 1000 employing a spectral device according to an exemplary embodiment.

Referring to FIG. 30, the optical measurement apparatus (hereinafter, measurement apparatus) 1000 may be an apparatus to measure/analyze properties/information of an object (object to be tested) OBJ in an optical method. The object OBJ may include a living body of a human or animal or food, in some cases, a non-living thing. Also, the object OBJ may be a sample for analyzing air pollution or water pollution. The measurement apparatus 1000 may include a light source portion 100 for irradiating light L10 to the object OBJ and an optical sensor portion 200 for detecting or sensing light L10' that is generated by the light source portion 100 and modulated by the object OBJ. The light source portion 100 may include, for example, a light source that generates light of an IR range. The optical sensor portion 200 may include the spectral devices according to the exemplary embodiments, for example, the spectral devices described with reference to FIGS. 19 to 29.

The measurement apparatus 1000 may include a controller 500 connected to the light source portion 100 and the optical sensor portion 200. The controller 500 may include a signal processor 300 for processing signals measured by the optical sensor portion 200. Also, the controller 500 may further include a user interface 400. The user interface 400 may include an input portion and an output portion. The input portion may be a device used by a user to input a command to the measurement apparatus 1000, and may be implemented by, for example, a keypad, a touch screen, a speech recognition device, or a button type input device. The output portion is a device for outputting an analyzed result and may include a display device or may be implemented by, for example, a sound system, a vibration device, or a printer. The controller 500 may be connected to the light source portion 100 and the optical sensor portion 200 by a wired or wireless method. Although illustrated in the drawings, the measurement apparatus 1000 may further include a memory or a communication portion.

The light source portion 100 and the optical sensor portion 200 may constitute one "spectrometer." Also, the light source portion 100 and the optical sensor portion 200 may constitute one "spectral sensor module." In some cases, the entire measurement apparatus 1000 may be one "spectrometer." In this case, the light source portion 100, the optical sensor portion 200, the signal processor 300, and the user interface 400 may constitute one "spectrometer."

When the light source portion 100 and the optical sensor portion 200 constitute one "spectral sensor module," the spectral sensor module may be configured to sense the light reflected and/or scattered by the object OBJ. Also, the spectral sensor module may be configured to sense the light transmitting through the object OBJ. While the former may be referred to as the "reflective spectral sensor module," the latter may be referred to as the "transmissive spectral sensor module." The reflective spectral sensor module is exemplarily described with reference to FIG. 31, and the transmissive spectral sensor module is exemplarily described with reference to FIG. 32.

Figure 31:
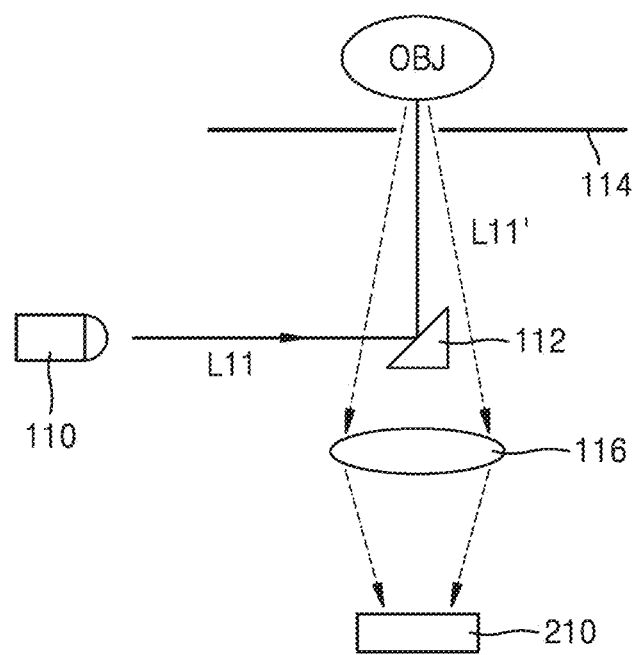
FIG. 31 is a diagram of an optical arrangement of a spectral sensor module applicable to the optical measurement apparatus of FIG. 30, according to an exemplary embodiment.

FIG. 31 is a diagram of an optical arrangement of the spectral sensor module applicable to the optical measurement apparatus 1000 of FIG. 30, according to an exemplary embodiment.

Referring to FIG. 31, according to the exemplary embodiment, the spectral sensor module may be of a reflective type. The spectral sensor module may be configured such that light L11 generated by a light source 110 is reflected and/or scattered by the object OBJ and then light L11' that is reflected and/or scattered by the object OBJ is sensed by an optical sensor 210.

A light path change member 112 for changing a path of the light L11 generated by the light source 110 may be provided. Although the light path change member 112 is illustrated to have a prism shape, this is exemplary and the light path change member 112 may have a shape of a beam splitter or a plate mirror. Also, the light path change member 112 may not be provided according to the position of the light source 110. The light L11 whose path is changed by light path change member 112 may be irradiated toward the object OBJ. An aperture 114 may be further provided between the light path change member 112 and the object OBJ. The light L11' that is reflected and/or scattered by the object OBJ may be sensed by the optical sensor 210. A lens 16 for focusing the reflected and/or scattered light L11' on the optical sensor 210 may be further provided. However, the structure of the reflective spectral sensor module illustrated in the drawing is exemplary and may be variously changed.

Figure 32:
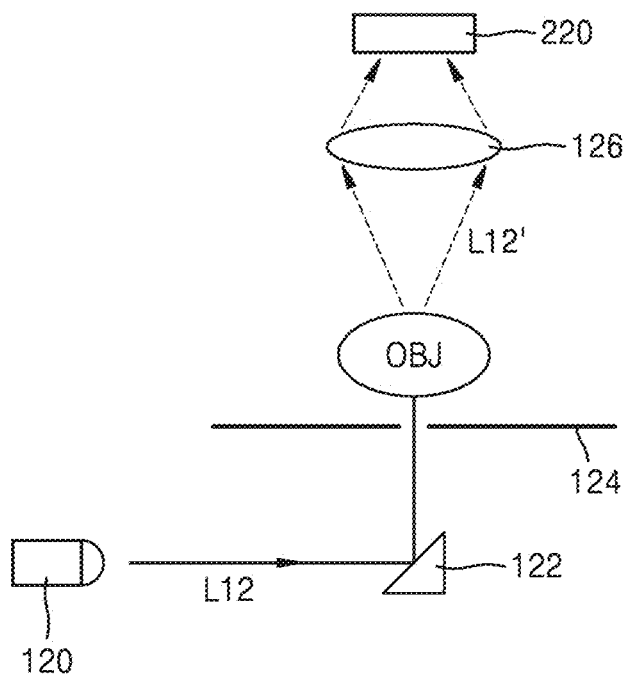
FIG. 32 is a diagram of an optical arrangement of a spectral sensor module applicable to the optical measurement apparatus of FIG. 30, according to another exemplary embodiment.

FIG. 32 is a diagram of an optical arrangement of a spectral sensor module applicable to the optical measurement apparatus 1000 of FIG. 30, according to another exemplary embodiment.

Referring to FIG. 32, the spectral sensor module according to the exemplary embodiment may be of a transmissive type. The spectral sensor module may be configured such that light L12 generated by a light source 120 passes through the object OBJ and light L12' that passed through the object OBJ is sensed by an optical sensor 220.

A light path change member 122 for changing a path of the light L12 generated by the light source 120 may be provided. The light L12 whose path is changed by the light path change member 122 may be irradiated toward the object OBJ. An aperture 124 may be further provided between the light path change member 122 and the object OBJ. The light L12' that passes through the object OBJ may be sensed by the optical sensor 220. A lens 126 for focusing the light L12' that passed through the object OBJ on the optical sensor 220 may be further provided. However, the structure of the transmissive spectral sensor module illustrated in the drawing is exemplary and may be variously changed.

At least a part of the optical the measurement apparatus 1000 according to the above-described exemplary embodiments may constitute at least a part of a mobile device or a wearable device. The mobile device may be, for example, a mobile phone (smart phone), and the wearable device may have a various shape, for example, a wristwatch type device, a wristband type device or bracelet type device, a glasses type device, a hairband type device, or a ring type device.

FIG. 33 is a diagram of a mobile device, to which an optical measurement apparatus according to an exemplary embodiment is applicable. In the exemplary embodiment, the mobile device is a mobile phone.

In FIG. 33, a left image (A) shows a front surface of a mobile phone and a right image (B) shows a rear surface of the mobile phone. An optical sensor of an optical measurement apparatus according to an exemplary embodiment may be provided to be exposed from the front surface or rear surface of the mobile phone. Alternatively, the optical sensor may be provided to be exposed from a side surface (including upper, lower, left, and right sides) of the mobile phone.

Figure 34:
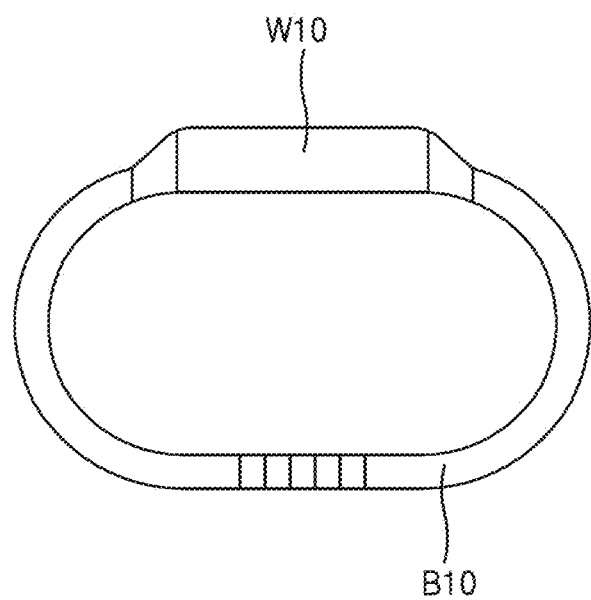
FIG. 34 is a diagram of a wearable device, to which an optical measurement apparatus according to an exemplary embodiment is applicable.

FIG. 34 is a diagram of a wearable device, to which an optical measurement apparatus according to an exemplary embodiment is applicable. In the exemplary embodiment, the wearable device is a wristwatch type device.

Referring to FIG. 34, the wristwatch type device may include a device main body portion (watch portion) W10 and a band portion B10. At least a part of the optical measurement apparatus according to the exemplary embodiment may be applied to the band portion B10, to the device main body portion W10, or separately to the band portion B10 and the device main body portion W10.

According to another exemplary embodiment, a part of the optical measurement apparatus is provided on a wristwatch type device of FIG. 34, and the other part may be provided on the mobile device (mobile phone) of FIG. 33. Also, the wearable device and the mobile device may be interactive and may have data communication therebetween.

Figure 35:
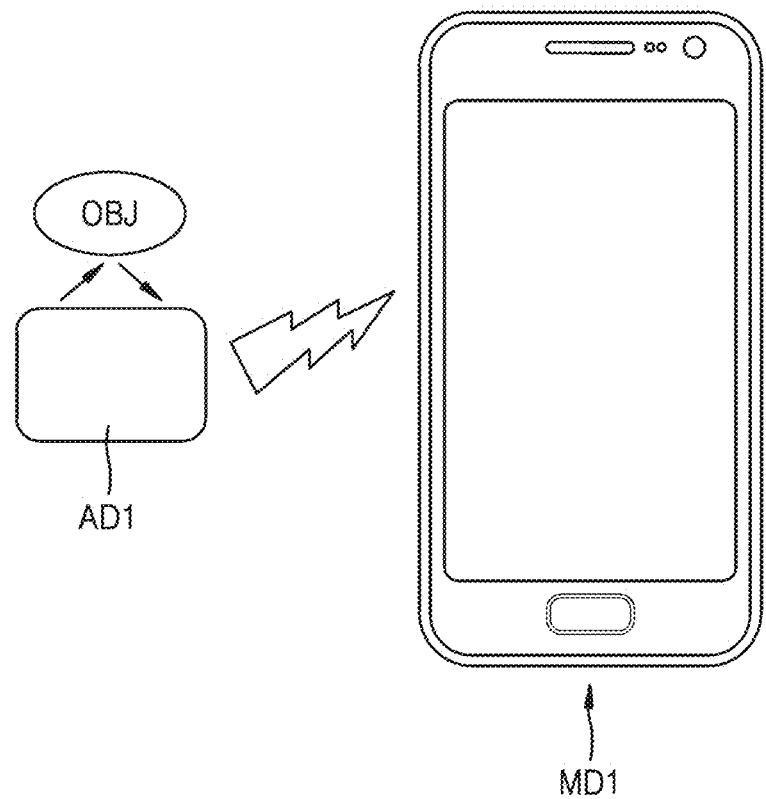
FIG. 35 is a diagram of an optical measurement apparatus according to another exemplary embodiment.

FIG. 35 is a diagram of an optical measurement apparatus according to another exemplary embodiment. Referring to FIG. 35, a mobile device MD1 may be provided and an auxiliary device AD1 is electrically connected to the mobile device MD1. The mobile device MD1 may be a sort of mobile phone (smart phone), and the auxiliary device AD1 may be a device including the spectral device (spectrometer) according to the exemplary embodiment. The mobile device MD1 and the auxiliary device AD1 may be may be connected to each other by a wireless or wired communication method. After an object OBJ is optically measured by using the auxiliary device AD1, measured data may be output via the mobile device MD1.

Because the spectral device (spectrometer) according to the exemplary embodiment is compact/ultra compact, the spectral device (spectrometer) may be easily applied to a small mobile device, a small wearable device, or a small auxiliary device.

The optical measurement apparatuses (measurement systems) according to the exemplary embodiments may be applied not only to the mobile device, the wearable device, and the auxiliary device, which are described with reference to FIG. 33 to FIG. 35, but also to medical devices used in hospitals or medical examination organizations, mid- or small-sized medical devices provided in public organizations, compact medical devices carried by individuals, and various health care apparatuses.

The optical unit devices according to the exemplary embodiments, and an array device including a plurality of optical unit devices, may be applied to optical apparatuses other than the spectrometer. For example, the optical unit devices and the array device may be applied to imaging apparatuses, bandpass filters, for example, IR bandpass filters, multi-bandpass filters, or display apparatuses. The imaging apparatus, for example, IR cameras, may include wavelength-selector arrays and pixel arrays, and the optical unit devices according to the exemplary embodiments may be applied to the wavelength-selector arrays. Also, the optical unit devices and the array devices may be applied to hyper-spectral imaging devices. The hyper-spectral imaging devices may be devices using remote sensing technologies. Although wavelengths of an IR range are mainly described in the above-described exemplary embodiments, the optical unit devices and the array devices according to the exemplary embodiments may be used to wavelength ranges other than the IR range, for example, a visible ray range or microwave range. In this case, technical fields utilizing the optical unit devices and the array devices may be further extended.

Although in the above description a lot of items are presented in detail, the items are interpreted to be detailed examples of exemplary embodiments rather than restrictions to the range of an inventive concept. For example, one of ordinary skill in the art would understand that the structure of the optical unit device described with reference to FIGS. 3, 8, 10, 11, 19 to 23, the structure of the optical device (array device) described with reference to FIGS. 24 and 25, the structure of the spectral device described with reference to FIGS. 26 to 29, the structure of the optical measurement apparatus described with reference to FIGS. 30 to 35 may be modified in various ways. In a detailed example, at least two of a plurality of slots included in one optical unit device may have two different sizes. When one optical unit device includes three or more slots, at least two of a plurality of gaps defined by the three or more slots may be different from each other. Also, one optical unit device may include five or more slots. In addition, the structures of the optical device (array device), the spectral device, and the measurement apparatus may be modified in various ways. The fields of optical devices to which the optical unit device and the array device are applied may be variously changed.

It may be understood that exemplary embodiments described herein may be considered in a descriptive sense only and not for purposes of limitation. Descriptions of features or aspects within each exemplary embodiment may be considered as available for other similar features or aspects in other exemplary embodiments. While exemplary embodiments have been described with reference to the figures, it will be understood by those of ordinary skill in the art that various changes in form and details may be made therein without departing from the spirit and scope as defined by the following claims.

What is claimed is:

1. An optical unit device for selectively transmitting electromagnetic waves of a wavelength range, the optical unit device comprising:
 a material layer comprising slots,
 wherein a gap between the slots has a distance such that the optical unit device has a Q-factor of about 5 or more,
 wherein a resonance wavelength of the optical unit device is determined based on the gap between the slots, and
 wherein the resonance wavelength of the optical unit device is $\lambda$, a refractive index of a medium contacting an incident surface of the material layer is n, and the distance of the gap between the slots is greater than $\lambda/(2.5 \times n)$.

2. The optical unit device of claim 1, wherein the gap between the slots has the distance such that the optical unit device has a Q-factor of about 7 or more.

3. The optical unit device of claim 1, wherein the gap between the slots has the distance such that the optical unit device has a normalized transmittance of about 3 or more, and
 the normalized transmittance is determined by dividing an intensity of electromagnetic waves passing through the material layer comprising the slots by an intensity of electromagnetic waves passing through a single slot of another optical unit device without the material layer.

4. The optical unit device of claim 1, wherein the distance of the gap between the slots is less than $\lambda/n$.

5. The optical unit device of claim 1, wherein each of the slots has a subwavelength size.

6. The optical unit device of claim 1, wherein the slots are parallel to each other.

7. The optical unit device of claim 1, wherein each of the slots has a length in a first direction and a width in a second direction perpendicular to the first direction, and
 the slots are spaced apart from each other in the second direction.

8. The optical unit device of claim 1, wherein the material layer comprises two to five slots that are spaced apart from one another by substantially a same gap and are parallel to one another.

9. The optical unit device of claim 1, wherein the material layer is a conductive layer.

10. The optical unit device of claim 1, wherein the slots are light source-less slots.

11. The optical unit device of claim 1, wherein the material layer is sectioned into regions, and
 each of the regions comprises slots parallel to one another.

12. The optical unit device of claim 1, wherein the material layer is sectioned into regions,
 at least one of the regions comprises first slots parallel to one another,
 at least another one of the regions comprises second slots parallel to one another, and
 the second slots are perpendicular to the first slots.

13. The optical unit device of claim 1, wherein the optical unit device is configured to transmit electromagnetic waves of an infrared ray (IR) range.

14. A spectral device comprising:
 a first array device comprising optical unit devices, each of the optical unit devices comprising the optical unit device of claim 1, and at least two of the optical unit devices being configured to transmit electromagnetic waves of different wavelength ranges; and
 a second array device comprising detectors configured to detect electromagnetic waves passing through the first array device.

15. The spectral device of claim 14, wherein the first array device comprises a first optical unit device and a second optical unit device,
 the first optical unit device comprises a first slot and a second slot,
 the second optical unit device comprises a third slot and a fourth slot, and
 a gap between the first slot and the second slot is different from a gap between the third slot and the fourth slot.

16. The spectral device of claim 15, wherein either one or both of the first slot and the second slot has a dimension different from a dimension of either one or both of the third slot and the fourth slot.

17. The spectral device of claim 15, wherein each of the first slot and the second slot has a first length, and
 each of the third slot and the fourth slot has a second length different from the first length.

18. The spectral device of claim 14, wherein the first array device comprises a first optical unit device and a second optical unit device, and
 a number of slots included in the first optical unit device is different from a number of slots included in the second optical unit device.

19. The spectral device of claim 14, wherein the first array device comprises a metasurface structure.

20. A spectrometer comprising the spectral device of claim 14.

21. An optical measurement apparatus for optically measuring properties of an object, the optical measurement apparatus comprising:
 a light source configured to irradiate light to the object;
 an optical sensor comprising the spectral device of claim 14, and configured to detect light that is irradiated by the light source and modulated by the object; and
 a signal processor configured to process a signal that is measured by the optical sensor.

22. The optical measurement apparatus of claim 21, wherein the light source is configured to irradiate light of an infrared range.

23. The optical measurement apparatus of claim 21, wherein at least a part of the optical measurement apparatus constitutes a wearable device.

24. The optical measurement apparatus of claim 21, wherein at least a part of the optical measurement apparatus constitutes a mobile device.

25. The spectral device of claim 14, further comprising:
 an intermediate layer disposed between the first array device and the second array device;
 a cover layer disposed on the first array device; and
 a focusing element array disposed on the cover layer.

26. An optical unit device for selectively transmitting electromagnetic waves of a wavelength range, the optical unit device comprising:
 a material layer comprising slots,
 wherein a gap between the slots has a distance greater than $\lambda/(2.5 \times n)$ where $\lambda$ refers to a resonance wavelength of the optical unit device and n refers to a refractive index of a medium contacting an incident surface of the material layer.

27. The optical unit device of claim 26, wherein the distance of the gap between the slots is less than $\lambda/n$.

28. The optical unit device of claim 26, wherein the gap between the slots has the distance such that the optical unit device has a Q-factor of about 5 or more.

29. The optical unit device of claim 26, wherein the gap between the slots has the distance such that the optical unit device has a normalized transmittance of about 3 or more, and the normalized transmittance is determined by dividing an intensity of electromagnetic waves passing through the material layer comprising slots by an intensity of electromagnetic waves passing through a single slot of another optical unit device without the material layer.

30. The optical unit device of claim 26, wherein the material layer comprises two to five slots that are spaced apart from one another by substantially a same gap and are parallel to one another.

31. The optical unit device of claim 26, wherein the slots are light source-less slots.

32. An optical unit device for selectively transmitting electromagnetic waves of a wavelength range, the optical unit device comprising:

a substrate; and a material layer comprising slots, and disposed on the substrate, wherein a gap between the slots has a distance corresponding to a Q-factor of the optical unit device, a resonance wavelength of the optical unit device, and a refractive index of the substrate.

33. The optical unit device of claim 32, wherein the gap between the slots has the distance such that the Q-factor is about 5 or more, and the distance of the gap between the slots is greater than $\lambda/(2.5 \times n)$ where $\lambda$ refers to the resonance wavelength of the optical unit device and n refers to the refractive index of the substrate.

* * * * *